United States Patent [19]
Arai et al.

[11] Patent Number: 5,021,719
[45] Date of Patent: Jun. 4, 1991

[54] DISPLAY

[75] Inventors: Ikuya Arai; Kouji Kitou, both of Yokohama; Michitaka Ohsawa, Fujisawa, all of Japan

[73] Assignee: Hitachi, Ltd., Tokyo, Japan

[21] Appl. No.: 448,980

[22] Filed: Dec. 12, 1989

[30] Foreign Application Priority Data

Dec. 23, 1988 [JP] Japan .................. 63-323519

[51] Int. Cl.$^5$ .................. H01J 29/70; H01J 29/72
[52] U.S. Cl. ............................................. 315/364
[58] Field of Search ............... 315/408, 364; 358/158

Primary Examiner—Theodore M. Blum
Attorney, Agent, or Firm—Antonelli, Terry, Stout & Kraus

[57] ABSTRACT

Disclosed is a display apparatus in which peculiar synchronizing signals fed while being accompanied by a video signal to be displayed are recognized, control signals for instructing picture scene size (display size) and picture display position optimum to the recognized synchronizing signals are generated by a digital automatic tracking circuit or the like, and horizontal and vertical deflection circuits are operated by the thus generated control signals so that a picture scene having optimum picture scene size and optimum display position is displayed on a display screen. The display apparatus is provided with: a synchronizing signal processing circuit for processing peculiar synchronizing signals fed thereto while being accompanied by the video signal so as to produce a horizontal synchronizing signal repeatedly occurring with a horizontal period and a vertical synchronizing signal repeatedly occurring with a vertical period; a memory for storing control information in advance; and a control processing circuit for recognizing a horizontal scanning frequency and a vertical scanning frequency on the basis of the horizontal synchronizing signal and the vertical synchronizing signal, and for reading out the control information from the memory on the basis of the result of recognition so as to produce and feed control signals for instructing picture display size and picture display position on the display screen to the horizontal deflection circuit and vertical deflection circuit.

6 Claims, 21 Drawing Sheets

FIG.3 SYNC. SIGNAL PROCESSING CIRCUIT 201

| S2 \ S1 | 0 | 1 |
|---|---|---|
| 0 | Sync onG | C. Sync |
| 1 | — | HS. VS |

FIG. 5 H/V SEPARATION AND POLARITY UNIFICATION CIRCUIT 303

FIG.7 H-OMISSION COUNTERMEASURE CIRCUIT 306

DISPLAY

BACKGROUND OF THE INVENTION

The present invention relates to a display in which when a variety of video signals different in scanning frequency from each other are received in an alternative way, it is possible to automatically determine a suitable picture size and a suitable picture position (display position) corresponding to the scanning frequency to thereby display a picture with the optimum picture size and picture position on a display screen.

A conventional display such as a terminal of a computer, or the like, has no defined standard with respect to a video signal to be displayed thereon, and therefore there exist a variety of video signals to be displayed which are different from each other in horizontal scanning frequency, vertical frequency, timing of display size, etc. Accordingly, a variety of displays having a variety of specifications corresponding to the various video signals are produced. Accordingly, the displays must be manufactured through multi-kind and small-quantity production with extremely poor productivity. Recently, however, there has been proposed a single display capable of accommodating such a variety of video signals to be displayed. This display has been called a multi-scanning display.

As examples of such a conventional multi-scanning display, there are those disclosed, for example, in Japanese Patent Unexamined Publication Nos. 61-199381, 61-108265, etc.

Referring to the drawings, those conventional multi-scanning displays will be described.

FIG. 20A is a block diagram showing the configuration of a horizontal deflection circuit of a first prior art example of such a multi-scanning display. In FIG. 20A, the horizontal deflection circuit includes a horizontal oscillating circuit 181 externally fed with a horizontal synchronizing signal HS, a horizontal driving circuit 182, a horizontal output circuit 183a, a control circuit 184 for controlling the circuits 181, 182, and 183a, and a flyback transformer 185.

The horizontal oscillating circuit 181 changes its oscillation frequency in response to a control signal fed from the control circuit 184. To this end, the control circuit 184 generates a control signal corresponding to the specification such as a scanning frequency of a video signal to be fed to the display so as to be displayed thereon. The control circuit further feeds control signals also to the horizontal output circuit 183a. In the horizontal output circuit 183a, those control signals are used to perform the control of the on/off operation of a characteristic change-over switch SW1 connected in parallel to an additional capacitor $C_1$ which is in turn connected to a resonance capacitor $C_0$, and the control of the on/off operation of another characteristic change-over switch SW2 connected in parallel to an additional coil $L_1$ which is in turn connected to a horizontal deflection coil $L_0$.

Thus, it is possible to maintain the ratio of a horizontal scanning period $T_s$ to a horizontal blanking period $T_r$ fixed, for example, between the cases where the horizontal oscillation frequency of the horizontal oscillating circuit 181 is selected to be $f_1$ and $f_2$ by the control circuit 184. Accordingly, it is possible to make the horizontal raster size fixed. The explanation about the horizontal output circuit 183a applies to another horizontal output circuit 183b shown in FIG. 20B and quite the same operation is performed in this circuit.

The above relationship in the case where the horizontal oscillation frequency is changed over may be expressed by the following equations. That is, with respect to the horizontal oscillation frequency $f_1$, the relationship among the horizontal scanning period $T_{s1}$, the horizontal blanking period $T_{r1}$ and the deflection current $I_{p1}$ is expressed as follows.

$$T_{s1} = \frac{2(L_0 + L_1)}{+V_B} I_{p1} \tag{1}$$

$$T_{r1} = \pi \sqrt{(L_0 + L_1)C_0} \tag{2}$$

where $+V_B$ represents the source voltage of the horizontal output circuit.

Similarly to this, with respect to the horizontal oscillation frequency $f_2$, the relationship among the horizontal scanning period $T_{s2}$, the horizontal blanking period $T_{r1}$ and the deflection current $I_{p2}$ is expressed as follows.

$$T_{s2} = \frac{2L_0}{+V_B} I_{p2} \tag{3}$$

$$T_{r2} = \pi \sqrt{L_0 - \frac{C_0 C_1}{C_0 + C_1}} \tag{4}$$

where $+V_B$ represents the source voltage of the horizontal output circuit. The respective values of the additional capacitor $C_1$ and the additional coil $L_1$ are selected so as to satisfy the above conditions. As the result, it is possible to make the horizontal raster size fixed with respect to video signals having known horizontal oscillation frequencies. In the case where a video signal having an unexpected oscillation frequency is fed, the horizontal raster size changes.

FIG. 21 is a block diagram showing the configuration of a vertical deflection circuit of a second prior art example of the multi-scanning display. In FIG. 21, the vertical deflection circuit includes an input terminal 190 to which a vertical synchronizing signal (VS) is fed, a vertical oscillating circuit (V. OSC) 191 for performing saw-tooth wave oscillation, a capacitor 192, a variable current source 193, comparators (COM) 194 and 195, an exclusive OR gate (hereinafter abbreviated to "EOR") 196, an up/down counter (hereinafter abbreviated to "UDC") 197 for performing counting in response to a vertical synchronizing signal (VS) applied thereto as a clock, a digital-to-analog converter (hereinafter abbreviated to "DAC") 198, a vertical output circuit 199, a deflection yoke 1910, a capacitor 1911, a resistor 1912, variable resistors 1913 and 1914, a change-over switch 1915, a change-over control circuit 1916, and an input terminal 1917 to which a selection signal (SL) is fed.

The operation of the circuit of FIG. 21 is as follows. When the vertical synchronizing signal (VS) is fed to the input terminal 190 of the vertical oscillating circuit 191, the capacitor 192 is discharged by the variable current source 193 so that saw-tooth wave oscillation is carried out. The waveform of the oscillation is controlled so that the amplitude thereof falls within a predetermined range. Assume now that the respective reference levels of the comparators 194 and 195 are selected so that the former is higher than the latter.

Then, when the oscillation amplitude is not higher than the reference level of the comparator 195, the UDC 197 is fed with a count-up control signal so as to increase the count data thereof. At this time, the output signal of the DAC 198 increases and the current value of the variable current source 193 increases. As the result, the oscillation amplitude of the saw-tooth wave becomes large. When the oscillation amplitude is not lower than the reference level of the comparator 194, the UDC 197 is set to a down counter so as to decrease the count data thereof. At this time, the output signal of the DAC 198 decreases and the current value of the variable current source 193 decreases. As the result, the oscillation amplitude of the saw-tooth wave becomes small. Further, when the oscillation amplitude takes a value within a range between the respective levels of the comparators 194 and 195, the UDC 197 is fed with the output signal of the EOR 196 so that the counting thereof is inhibited.

In such a manner as described above, a sawtooth wave signal having an amplitude within a predetermined range is fed to one input (positive phase input) of the operational-amplifier type vertical output circuit 199, and vertical raster having a predetermined display size can be obtained from the vertical deflection yoke. The capacitor 1911 and the resistor 1912 are connected in series to the vertical deflection yoke and the variable resistors 1913 and 1914 are connected in parallel to the resistor 1912. One of the variable resistors 1913 and 1914 is selected by the switch 1915 so that the output of the selected one of the variable resistors 1913 and 1914 is fed through the switch 1915 to the other input (reverse phase input) of the vertical output circuit 199. By the variable resistors 1913 and 1914, the vertical size is selectively changed over to either one of the respective preset values of the variable resistors 1913 and 1914 in accordance with the control signal SC from the change-over control circuit 1916. Thus, a desirable effective display rate can be obtained. Further, the change-over control circuit 1916 is controlled by the signal SL fed from a main control circuit (not shown).

However, in actual video signals, not only the vertical frequency of the vertical synchronizing signal (VS) but the vertical display size are diverse. Accordingly, in the case where such a video signal is fed, it is necessary to control the resistance values of the respective variable resistors 1913 and 1914 again so as to obtain a desirable effective display ratio.

Further, there has been proposed a display in which it is not necessary for a user to adjust the display size and display position every time when the video signal to be fed changes. As a third prior art example of such a display, there is that disclosed, for example, in Japanese Utility Model Unexamined Publication No. 62-156990.

FIG. 22 is a block diagram showing a display as the third prior art example. In FIG. 22, the display includes a reception circuit 221 for receiving video signals, a video system circuit 222 for processing a video signal, a cathode ray tube (CRT) 223, a video system circuit 222 having selection switches for selecting the video signals, input ports 225 and input port 227, a control circuit 226, a horizontal and vertical deflection circuit 228, a memory 229, and an output port 2211, a procedure memory 2212 for storing an operation routine, and a DAC 2213.

The operation of the circuit illustrated in FIG. 22 is as follows. Assume that a plurality of video signals are fed to the reception circuit 221. One of those video signals is selected by one of the switches of the first input circuit 224, and the selected video signal is fed to the video system circuit 222. The selection switches of the first input circuit 224 and the video signals have one-to-one correspondency therebetween. More specifically, if a user selects, for example, a first one of the selection switches, a first one of the video signals is selected in the reception circuit 221. The information from the first selection switch is fed to the control circuit 226 through the input port 225. In response to the thus fed information, the control circuit 226 reads out various control signals corresponding to the first video signal from the memory 229 and supplies the readout control signals to the output port 2211 and the DAC 2213.

The output port 2211 feeds the control signal and information to the video system circuit 222 and the horizontal and vertical deflection circuit 228. The DAC 2213 feeds information to the horizontal and vertical deflection circuit 228. In this manner, corresponding to the first video signal, a circuit within the video system circuit 222 and a circuit within the horizontal and vertical deflection circuit 228 are selected and a picture of the first video signal is displayed on the cathode ray tube 223 with desirable horizontal and vertical display sizes and at a desirable display position.

Similarly to the above operation with respect to the first video signal, the second or third selection switch is selected for the second or third video signal and the same operation as in the case of the first video signal is carried out.

Further, a selection signal (SL), a horizontal synchronizing signal (HS) and a vertical synchronizing signal (VS) are fed to the input port 227. The characteristics of those signals may be judged in the control circuit 226 so that this operation is substituted for the above-mentioned selection function.

In such a prior art display as described above, however, unless the selection order in the input portion (the input port 225 and the first input circuit 224) and the video signals to be fed have one-to-one correspondency, erroneous control signals are read out and a desired display picture cannot be obtained. Accordingly, it is necessary to perform the connection necessary for selecting the fed video signals in correct order. Further, in order to obtain a display size and a display position in an optimum manner, it is necessary that all the video signals to be fed have known specifications respectively. Further, since optimum circuits are selected with respect to the horizontal and vertical deflection circuit 228 and the video system circuit 222, there is a possibility that erroneous selecting operation is performed when a video signal having an unknown specification as to a scanning frequency and a synchronizing signal is fed.

Further, in the horizontal and vertical deflection circuit 228, several kinds of circuit constants are selectively changed over. Accordingly, the above horizontal and vertical deflection circuit 228 becomes impossible to cope with a video signal having an unexpected specification, while it can cope with a video signal having a known specification. In order to make the horizontal and vertical deflection circuit 228 cope with such a video signal having an unexpected specification, it is necessary to control the circuit constants of the horizontal and vertical deflection circuit 228 again. Moreover, since change-over operation is performed, the circuit operation is apt to become unstable and the circuit may be damaged in the worst case.

SUMMARY OF THE INVENTION

It is therefore an object of the present invention to solve the problems in the prior art.

It is another object of the present invention to provide a display in which with respect to any video signal having any specification, an optimum display picture corresponding to the specification of the video signal can be obtained without requiring any control signal and any selection switch, and, therefore, the deflection circuit always can perform operation stably.

In order to achieve the above objects, the display according to the present invention comprises: a control processing circuit for recognizing peculiar synchronizing signals fed while being accompanied by a video signal, and for reading out control information stored in advance in a memory on the basis of the result of recognition so as to form control signals for instructing display position and display size on a display screen on the basis of the read-out control information; and horizontal and vertical deflection circuits responsive to the control signals from the control processing circuit so as to display, on the display screen, a picture having the display position and the display size as instructed by the control signals.

In order to more preferably achieve the above objects, the control information stored in the abovementioned memory is composed of first control information with respect to the specifications of video signals which are previously expected to be fed and second control information indicating display positions and display sizes which can be set by a user per se separately from the first control information.

The control processing circuit recognizes the horizontal scanning frequency and vertical frequency from the peculiar synchronizing signals fed thereto, and reads out the control information stored in advance in the memory on the basis of the result of recognition. Further, the control processing circuit forms and outputs the control signals for instructing the display size and position on the display screen on the basis of the read-out control information. The control processing circuit is constituted by a central processing unit (CPU) and so on. Further, a user who uses the display can externally feed desired control information to the memory in advance. The thus externally fed control information is stored in the memory so as to be used in calculation of the display size and display position on the display screen.

On the other hand, the horizontal and vertical deflection circuits control the display screen continuously (not discontinuously) so as to make the horizontal and vertical display sizes and the display position agree with the instructed values respectively on the basis of the control signals fed from the control processing circuit.

According to the present invention, optimum picture scene can be displayed without requiring manual change of the setting of display of picture scene even if the specification of an input video signal is changed over, because the peculiar synchronizing signals fed while being accompanied by a video signal to be displayed are recognized, and the control signals (control data or correction data) for instructing the optimum picture scene size (display size) and display position corresponding to the synchronizing signals are automatically generated by the digital automatic tracking circuit (DAT) so that the horizontal and vertical deflection circuits operate in response to the control signals to display a picture having the optimum picture scene size and display position on the display screen. That is, it is possible to always obtain picture display having predetermined display size and display position. Further, the horizontal and vertical deflection circuits operate stably because they operate variably continuously, not by discontinuously changing over the internal circuit constants by control signals such as adjustment data or the like.

Further, the above-mentioned DAT is constituted by the above-mentioned control processing circuit.

BRIEF DESCRIPTION OF THE DRAWINGS

Other features and advantages of the present invention will be apparent from the following description taken in connection with the accompanying drawings, wherein.

DESCRIPTION OF THE PREFERRED EMBODIMENTS

Figure 1:
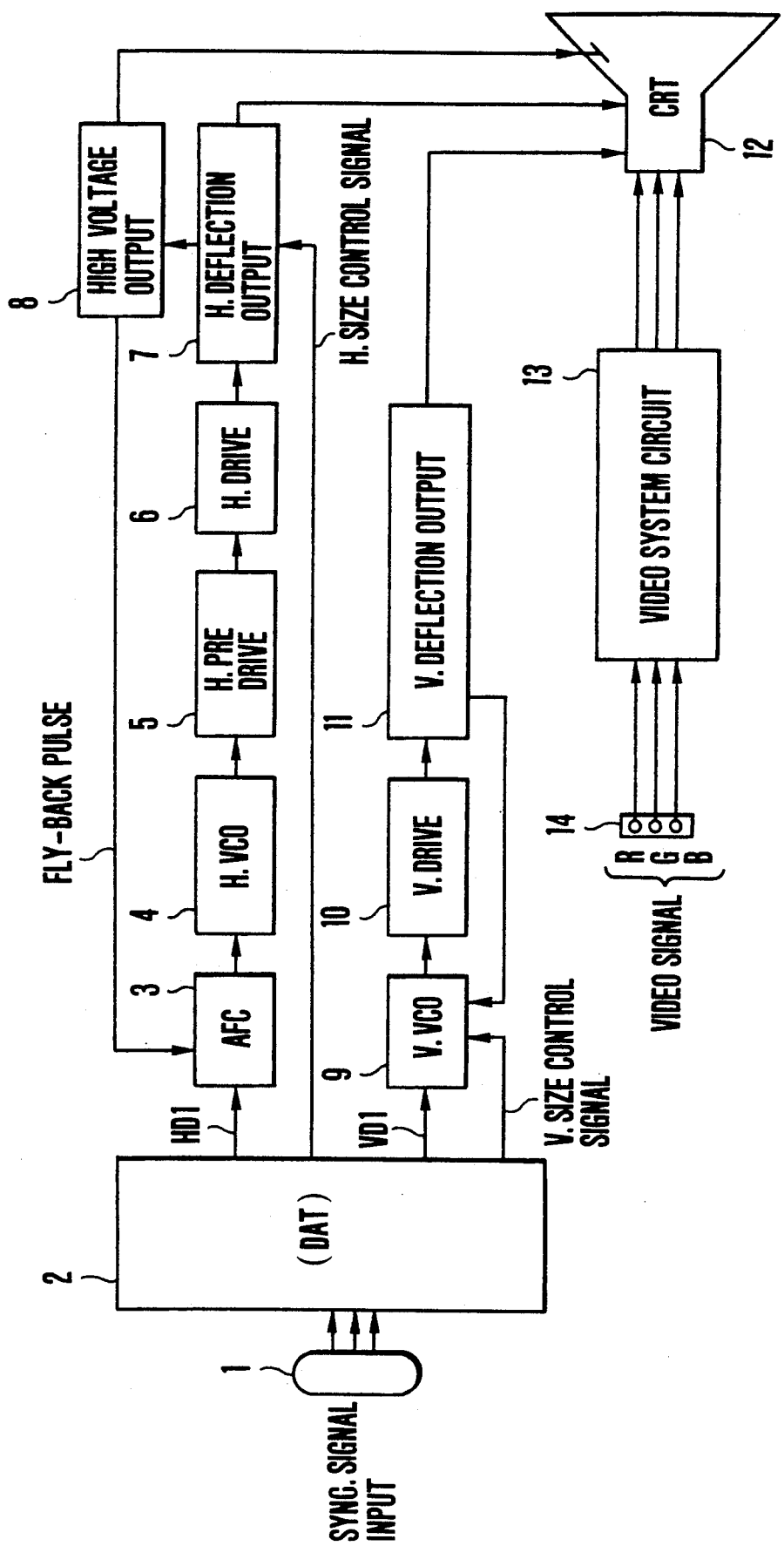
FIG. 1 is a block diagram showing a first embodiment of the display according to the present invention.

Referring to the drawings, embodiments of the display according to the present invention will be described hereunder.

FIG. 1 is a block diagram showing the configuration of a first embodiment of the display according to the present invention. In FIG. 1, the display includes; an input terminal 1 for receiving peculiar synchronizing signals HS, VS, etc. which will be fed while being accompanied by a video signal to be displayed; a digital automatic tracking circuit (hereinafter abbreviated as "DAT") 2 for determining a display position and a display size in accordance with the synchronizing signals fed thereto and for producing control signals for indicating the display position and the display size; an automatic frequency control circuit (hereinafter abbreviated as "AFC") 3; a horizontal oscillating circuit (H. VCO) 4, a horizontal pre-driving circuit (H. PRE DRIVE) 5; a horizontal driving circuit (H. DRIVE) 6; a horizontal deflection output circuit 7; a high voltage output circuit 8; a vertical oscillating circuit (V. VCO) 9; a vertical driving circuit (V. DRIVE) 10; a vertical deflection output circuit 11; a cathode ray tube (CRT) 12; a video system circuit 13; and an input terminal 14 for receiving video signals (R, G, B).

When synchronizing signals (HS, VS, etc.) are fed to the DAT 2 through the synchronizing signal input terminal 1, the DAT 2 recognizes the synchronizing signals (HS, VS, etc.). On the basis of the result of recognition, the DAT 2 determines a display position and a display size corresponding to the synchronizing signals (HS, VS, etc.) and produces control signals for indicating the determined display position and display size. Specifically, as the control signal for indicating the display position, the DAT 2 produces and outputs a horizontal synchronizing signal HD1 and a vertical synchronizing signal VD1 which have been phase-adjusted with respect to the synchronizing signals fed thereto. As the control signal for indicating the display size, on the other hand, the DAT 2 produces a horizontal size (H size) control signal and a vertical size (V size) control signal. After produced, the H-size control signal is fed to the horizontal deflection circuit 7, and, on the other hand, the V-size control signal is fed to the vertical oscillating circuit 9. Each of the produced H-size control signal and the V-size control signal is in the form of a DC voltage signal.

The horizontal synchronizing signal HD1 is fed to the AFC 3. The output signal of the AFC 3 is fed to the horizontal oscillating circuit 4. The horizontal oscillating circuit 4 performs saw-tooth wave oscillation and feeds a horizontal oscillating signal to the horizontal driving circuit 6 through the horizontal pre-driving circuit 5 in the following stage. The horizontal driving circuit 6 generates an output pulse on the basis of the horizontal oscillating signal. The output pulse generated by the horizontal driving circuit 6 is fed to the horizontal deflection output circuit 7. The output pulse causes the horizontal deflection yoke (not shown) in the horizontal deflection output circuit 7 to generate a deflecting magnetic field. As a result, the horizontal deflection of the cathode ray tube 12 is performed.

The horizontal display size of a picture is changed in accordance with the strength of the deflecting magnetic field generated by the horizontal deflection yoke. The above H-size control signal is related to the control of the strength of the deflecting magnetic field.

The output signal of the horizontal deflection output circuit 7 is fed also to the high voltage output circuit 8. A high voltage produced from the high voltage output circuit 8 is fed to a high voltage terminal of the cathode ray tube 12. A pulse signal (a flyback pulse) generated in the high voltage output circuit 8 is fed back to the AFC 3.

On the other hand, the vertical synchronizing signal VD1 obtained in the DAT 2 is fed to the vertical oscillating circuit 9. The vertical oscillating circuit 9 performs saw-tooth wave oscillation in a vertical scanning period. An amplitude of the oscillated wave is controlled by the above V-size control signal. Accordingly, the vertical display size of the picture is changed. The oscillated output signal of the vertical oscillating circuit 9 is fed to the vertical driving circuit 10. The vertical driving circuit 10 produces a driving pulse for driving the vertical deflection output circuit 11. The driving pulse is fed to the vertical deflection output circuit 11. The driving pulse generates a deflecting magnetic field on a vertical deflection yoke (not shown) in the vertical deflection output circuit 11. The cathode ray tube 12 is vertically deflected by the deflecting magnetic field. A pulse signal generated in the vertical deflection output circuit 11 is fed back to the vertical oscillating circuit 9.

A video signal is fed to the video signal input terminal 14 from the outside, and subjected to signal-system processing in the video system circuit 13. The output signal of the video system circuit 13 is fed to the cathode ray tube 12.

As described above, a video signal fed from a computer or the like is displayed on a display screen with the optimum display size and display position which are proper to the peculiar synchronizing signals (HS, VS, etc.) accompanied with the video signal.

Specific examples of main blocks in FIG. 1 will be described hereunder.

Figure 2:
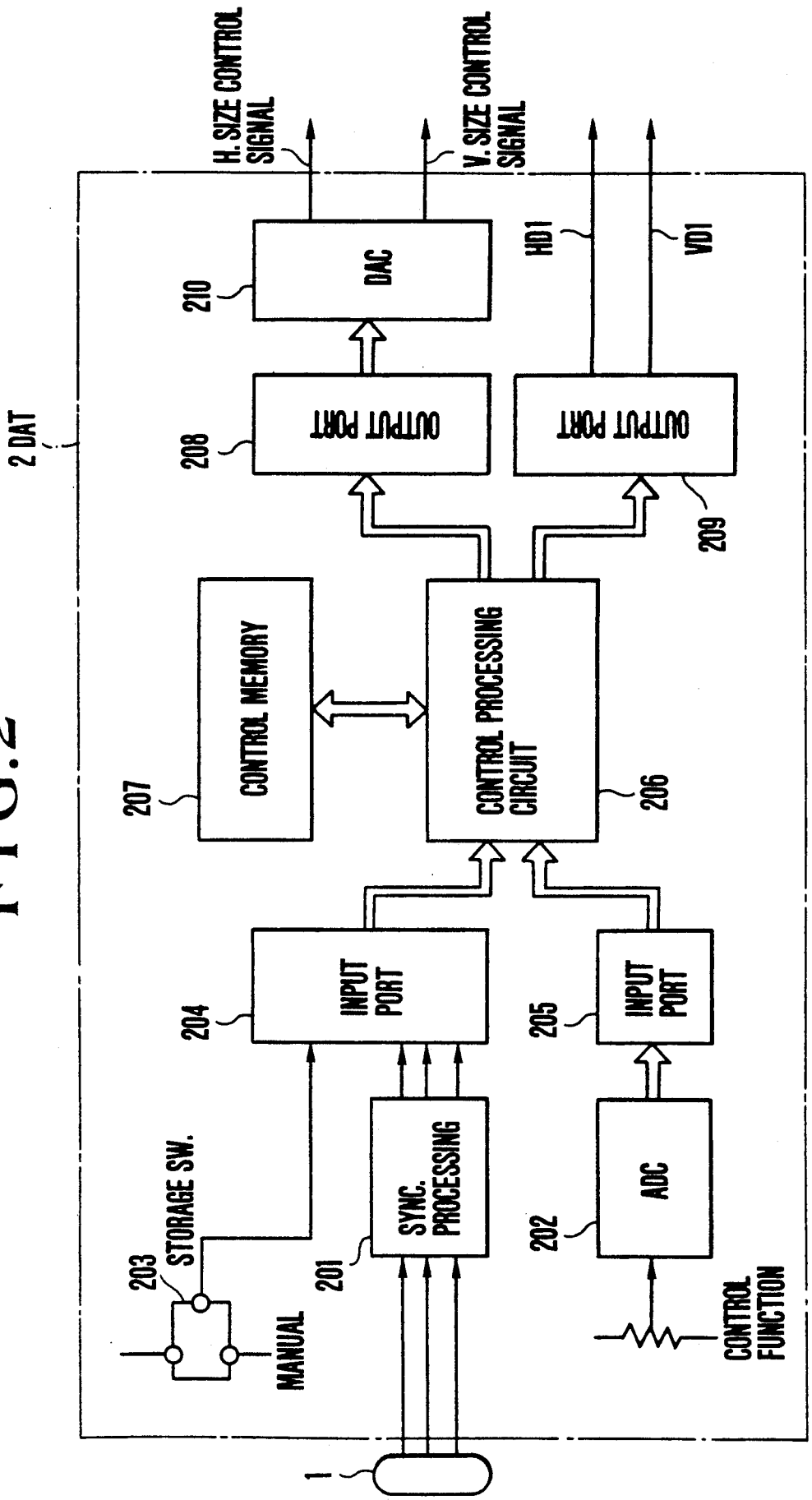
FIG. 2 is a block diagram showing the detailed configuration of a first embodiment of the digital automatic tracking (DAT) circuit illustrated in FIG. 1.

FIG. 2 is a block diagram showing a detailed configuration of a first embodiment of the DAT 2 in FIG. 1.

In FIG. 2, the DAT 2 includes: a synchronizing signal processing circuit 201; an analog-to-digital converter (hereinafter abbreviated as "ADC") 202; a memory switch 203; input ports 204 and 205; a control processing circuit 206; a control memory 207; output ports 208 and 209; and a digital-to-analog converter (hereinafter abbreviated as "DAC") 210.

The operation of the circuit illustrated in FIG. 2 is as follows. Peculiar synchronizing signals accompanied by a video signal to be displayed are fed from the synchronizing signal input terminal 1 to the synchronizing signal processing circuit 201. The synchronizing signals (HS, VS, etc.) are detected in the synchronizing signal processing circuit 201. Depending on the peculiar forms of the synchronizing signals, the synchronizing signals are subjected to separation into horizontal and vertical synchronizing signals, and unification of polarities of the synchronizing signals. A horizontal synchronizing signal HD2 and a vertical synchronizing signal VD2 are put out after being formulated. Thus, the horizontal synchronizing signal HD2 and the vertical synchronizing signal VD2 obtained in the sycnhronizing signal processing circuit 201 are fed to the control processing circuit 206 through the input port 204. The control processing circuit 206 is constituted by use of, for example, an LSI of a one-chip microcomputer or the like.

The control processing circuit 206 judges the respective frequencies of the horizontal and vertical synchronizing signals HD2 and VD2 fed thereto, in accordance with the program stored in the control memory 207. Control data corresponding to the judged horizontal synchronizing signal HD2 and the vertical synchronizing signal VD2 are selected from an address range different from that of the above program in the control memory 207. Of the thus obtained control data, control data for indicating a display size (an H-size control signal and a v-size control signal) are fed to the DAC 210 through the output port 208. The DAC 210 converts the control data from analog signals to digital signals and outputs the thus converted signals. The digital-to-analog converted H-size and V-size control signals are respectively fed to the horizontal deflection output circuit 7 and the vertical oscillating circuit 9 shown in FIG. 1.

Of the above control data, control data for indicating a display position are used to delay the horizontal and vertical synchronizing signals (HD2 and VD2) fed to the control processing circuit 206 through the input port 204 to thereby shift the phases of the synchronizing signals (HD2 and VD20) so as to control the display position of a video signal on a display screen. The display position on the cathode ray tube 12 is made optimum through this delay processing. The horizontal synchronizing pulse HD1 and the vertical synchronizing pulse VD1 which have been obtained by the delay processing are fed through the output port 209 to the AFC 3 and the vertical oscillating circuit 9 respectively.

The above description has been made as to the case of automatic control in the display according to the present invention, in which a user is not necessary to perform adjustment. Of course, the display position and the display size can be manually adjusted in accordance with user's wish. The manual adjustment is performed through the ADC 202 shown in FIG. 2. In the case of the manual adjustment, the setting of the memory switch 203 is changed over from an automatic mode into a manual mode, and the setting information of the memory switch is fed to the control processing circuit 206 through the input port 204. Then, the digitalized manual adjustment data are fed to the control processing circuit 206 through the ADC 202 and the input port 205.

The control processing circuit 206 calculates the control signals for indicating the display size and the display position respectively on the basis of the manual adjustment data. The calculated data are sent out through the output ports 208 and 209 and the DAC 210 similarly to the case described above.

Further, the manual adjustment data are stored in the control memory 207 when the setting of memory switch 203 is changed over from the manual mode to the automatic mode again. In the case in which the same video signal is fed succeedingly, the manual adjustment data are automatically read out from the control memory 207 so as to be fed to the control processing circuit 206. On the basis of the read-out manual adjustment data, the control data for indicating the display size and the display position are produced. For example, the control memory 207 is constituted by a read-only memory (ROM), a random access memory (RAM), and a large scale integrated circuit (LSI).

Although only one ADC 202 is disclosed in FIG. 2, the configuration may be made so that ADCs are used, two for adjusting the horizontal and vertical sizes respectively, and the remaining two for adjusting the horizontal and vertical phases (display position) respectively. Alternatively, the configuration may be made so that only one ADC is used, selection is made so as to adjust any one of the display sizes and the phases (the display position).

Figure 3:
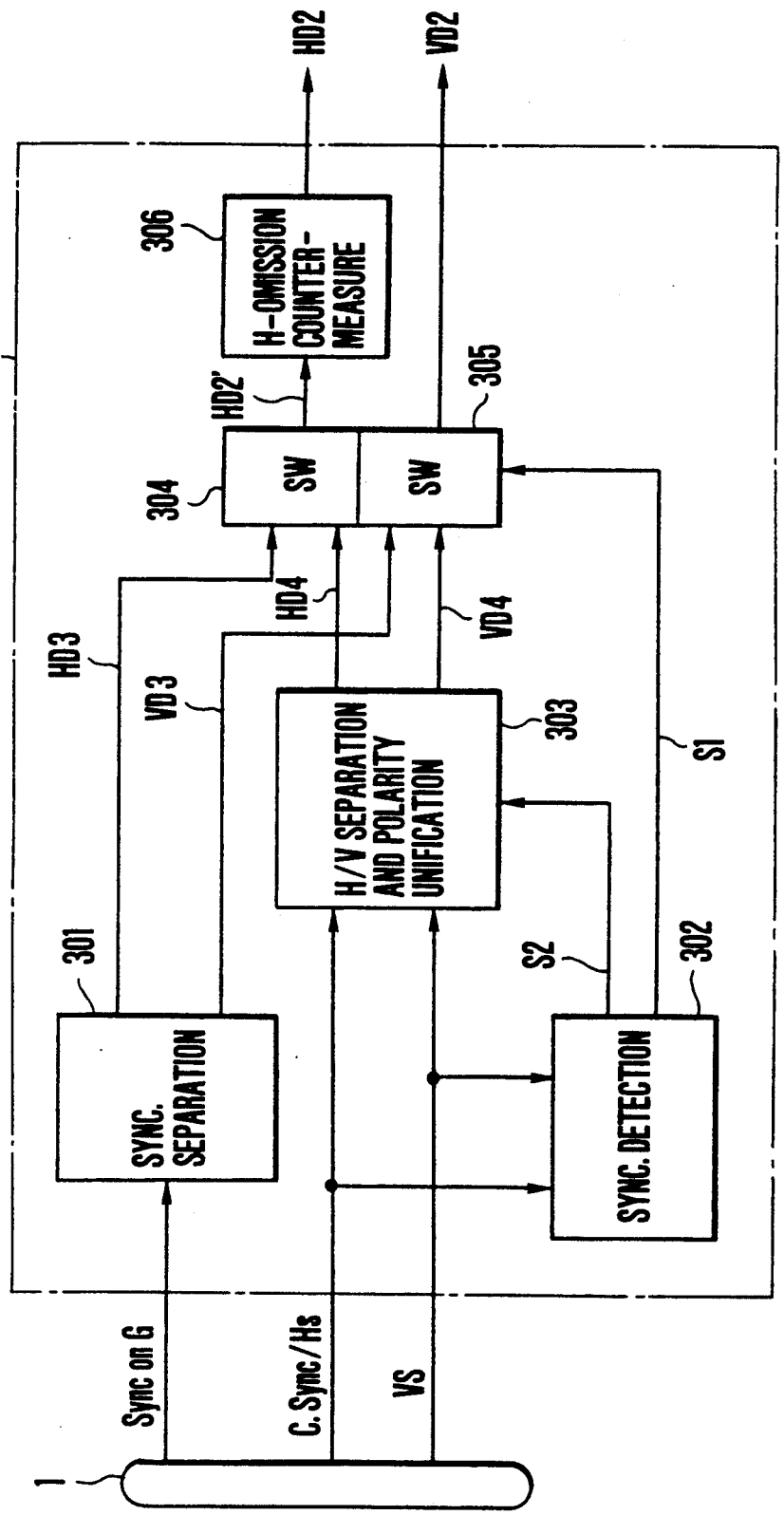
FIG. 3 is a block diagram showing the detailed configuration of the synchronizing signal processing circuit illustrated in FIG. 2.

FIG. 3 is a block diagram showing the detailed configuration of the synchronizing signal processing circuit 201 in FIG. 2.

In FIG. 3, the synchronizing signal processing circuit 201 includes: a synchronous separation circuit 301; a synchronizing signal detection circuit 302; a horizontal/vertical (H/V) synchronous separation and polarity unification circuit 303 for separating a horizontal synchronizing signal and a vertical synchronizing signal and for unifying the polarity of the synchronizing signals; change-over switches 304 and 305; and an H-omission countermeasure circuit 306 for detecting lack of a horizontal synchronizing signal HD2' of the synchronizing signals so as to supplement the lack portion with a pseudo-horizontal synchronizing signal.

The operation of the synchronizing signal processing circuit 201 in FIG. 3 is as follows. Peculiar synchronizing signals are fed to the synchronizing signal input terminal 1 as the video signal is fed. It is assumed that there are three kinds of forms of the synchronizing signals; a form in which a composite synchronizing signal is superimposed on a primary color signal G (Sync on G); a form of a composite synchronizing signal (C. Sync); and a form in which signals are sent out in a condition where they are previously separated into a horizontal synchronizing signal (HS) and a vertical synchronizing signal (VS).

The signal "Sync on G" is directly fed from the input terminal 1 to the synchronous separation circuit 301. Accordingly, the signal "Sync on G" is subjected to separation in the synchronous operation circuit 301 to obtain a horizontal synchronizing signal (HD3) and a vertical synchronizing signal (VD3). The synchronizing signals HD3 and VD3 are fed to the switching switches 304 and 305 respectively.

On the other hand, in the case where the composite synchronizing signal "C. Sync" is fed to the synchronizing signal input terminal 1, the signal is fed from the synchronizing signal input terminal 1 to the H/V separation and polarity unification circuit 303 and the synchronizing signal detection circuit 302. Further, in the case where the synchronizing signals are fed in the form of a mixture of the separated horizontal and vertical synchronizing signals HS and VS, the synchronizing signals are fed from the synchronizing signal input terminal 1 to the H/V separation and polarity unification circuit 303 and the synchronizing signal detection circuit 302. The horizontal synchronizing signal HS is fed onto an input signal line of the composite synchronizing signal "C. Sync".

In either case where the composite synchronizing signal "C. Sync" or the separated horizontal and vertical synchronizing signals HS and VS are received, the signal/signals are fed to the H/V synchronous separation and polarity unification circuit 303. A horizontal synchronizing signal HD4 and a vertical synchronizing signal VD4 which are unified in synchronizing polarity in the H/V synchronous separation and polarity unification circuit 303 are fed to other terminals of the change-over switches 304 and 305 respectively.

The synchronizing signal detection circuit 302 detects the fact that the signal/signals being fed is either one of the composite synchronizing signal and the separated horizontal and vertical synchronizing signals HS and VS or neither the composite synchronizing signal nor the separated horizontal and vertical synchronizing signals HS and VS (in the latter case, it is determined that the signal "Sync on G" is being fed). Thereafter, the synchronizing signal detection circuit 302 generates control signals S2 and S1 for controlling the H/V synchronous separation and polarity unification circuit 303 and the change-over switches 304 and 305 respectively.

That is, in the case where the composite synchronizing signal "C. Sync" is being fed to the synchronizing signal input terminal 1, both the operations of horizontal/vertical synchronous separation and polarity unification are performed in the H/V synchronous separation and polarity unification circuit 303. In the case where the separated synchronizing signals HS and VS are being fed to the synchronizing signal input terminal 1, only the polarity unification is performed in the H/V synchronous separation and polarity unification circuit 303. When the composite video signal "Sync on G" is fed to the synchronizing signal input terminal 1, the change-over switches 304 and 305 select the output signals HD3 and VD3 of the synchronous separation circuit 301 respectively. When either the composite synchronizing signal "C. Sync" or the separated synchronizing signals HS and VS are fed to the synchronizing signal input terminal 1, on the contrary, the change-over switches 304 and 305 select the output signals HD4 and VD4 of the H/V synchronous separation and polarity unification circuit 303 respectively. The selection of the change-over switches is controlled in accordance with the control signal S1 from the synchronizing signal detection circuit 302.

Of the horizontal synchronizing signal HD2' and the vertical synchronizing signal VD2 which are obtained through the switches 304 and 305 respectively as described above, the horizontal synchronizing signal HD2' is fed to the H-omission countermeasure circuit 306. In the case where the horizontal synchronizing signal HD2' is omitted in a period in which the vertical synchronizing signal VD2 is present, the H-omission countermeasure circuit 306 detects the lack of the horizontal synchronizing signal HD2' and supplements the lack portion with a pseudo-horizontal synchronizing signal. As described above, the horizontal synchronizing signal (HD2) and the vertical synchronizing signal (VD2) which have been made to be the same in polarity are produced from the synchronizing signal processing circuit 201.

Figure 4:
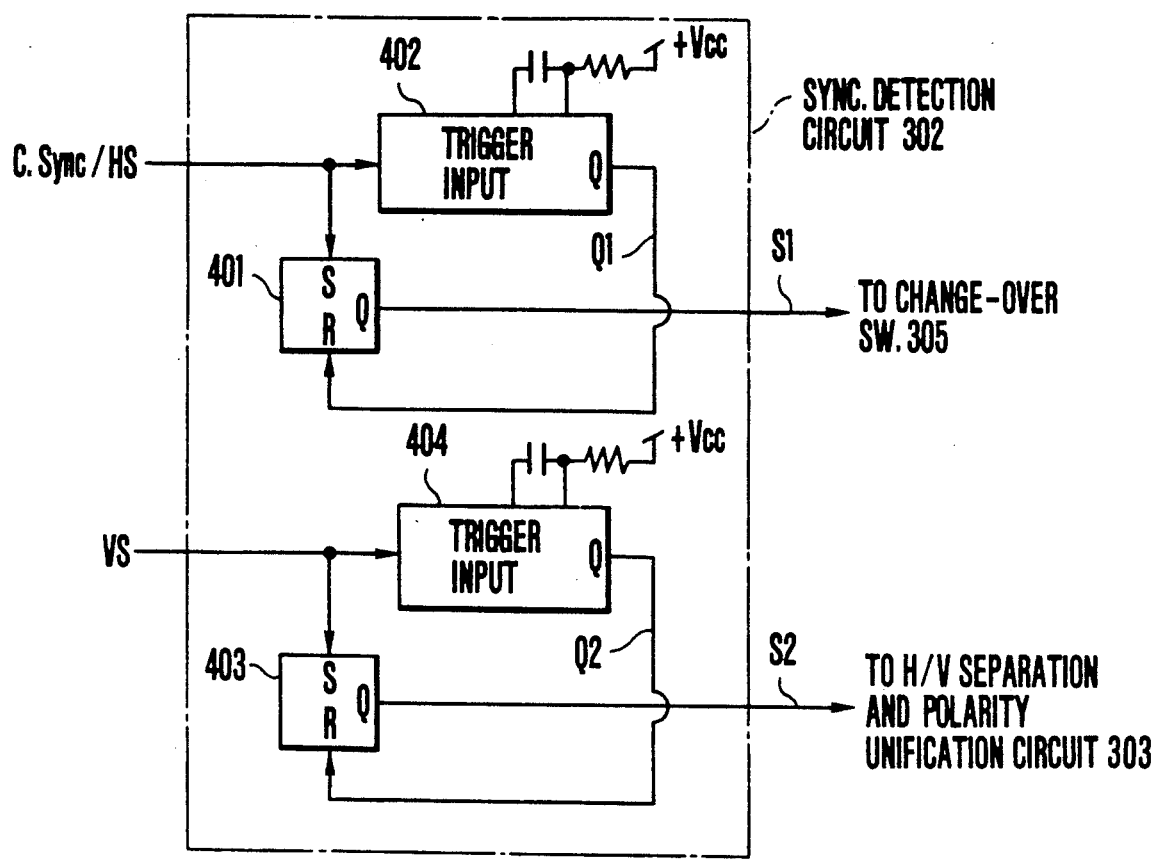
FIG. 4A is a circuit diagram showing the detailed configuration of the synchronizing signal detection circuit illustrated in FIG. 3.
FIG. 4B is an explanatory diagram showing the correspondence between the output signals $S_1$ and $S_2$, and the kind of the synchronizing signals.

FIG. 4A is a circuit diagram showing the specific configuration of the synchronizing signal detection circuit 302 in FIG. 3.

In FIG. 4A, the synchronizing signal detection circuit 302 includes set/reset (RS) type flip-flops (FF) 401 and 403, and monostable multivibrators 402 and 404 having time constants different from each other. The composition synchronizing signal "C. Sync" or the horizontal synchronizing signal HS of the separated synchronizing signals is fed to a set terminal S of the FF 401. At that time, when the horizontal synchronizing signal HS exists, the FF 401 is set to thereby produce an output signal S1 in a high level. When the horizontal synchronizing signal HS becomes absent, the output signal Q1 of the monostable multivibrator 402 having a time constant larger than a horizontal scanning period of the fed horizontal synchronizing signal HS changes so as to reset the FF 401. Accordingly, the level of the output signal S1 of the FF 401 is made to be low.

Similarly to the horizontal synchronizing signal HS, the vertical synchronizing signal VS of the separated synchronizing signals is fed to the FF 403. When the vertical synchronizing signal VS is being fed, the output signal S2 of the FF 403 is set to a high level. When the vertical synchronizing signal VS is not fed, on the contrary, the output signal S2 is set to a low level. The time constant of the monostable multivibrator 404 is set to a value larger than the vertical scanning period of the fed vertical synchronizing signal VS.

As described above, by examining the respective states of the output signals S1 and S2, it is possible to detect the kind of the synchronizing signal which is being fed to the synchronizing signal input terminal 1 shown in FIG. 1. FIG. 4B is a view showing the relationship of the correspondence between the respective states of the output signals S1 and S2 and the kinds of the synchronizing signals fed in those states.

Figure 5:
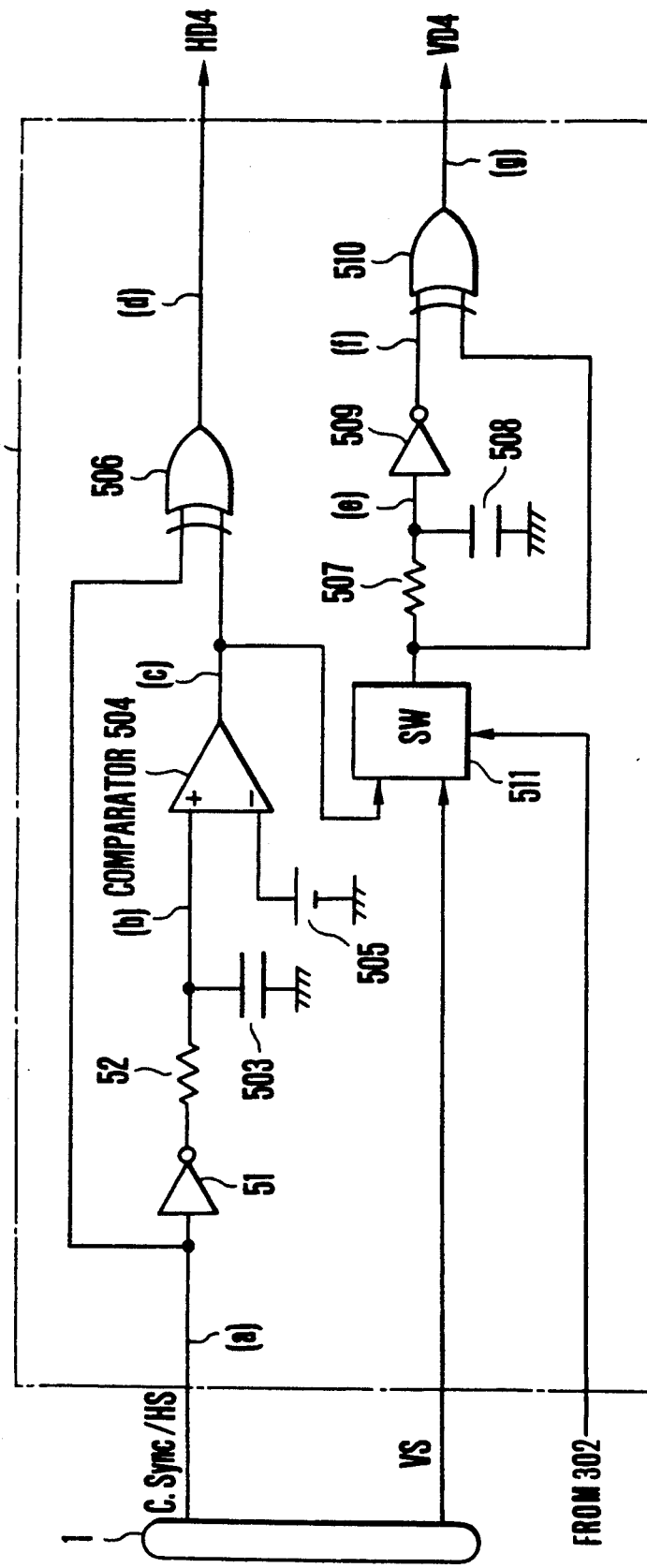
FIG. 5 is a circuit diagram showing the detailed configuration of the horizontal/vertical synchronous separation and polarity unification circuit illustrated in FIG. 3.

FIG. 5 is a circuit diagram showing the specific configuration of the horizontal/vertical (H/V) synchronous separation and polarity unification circuit 303 in FIG. 3.

In FIG. 5, the H/V synchronous separation and polarity unification circuit 303 includes invertors 51 and 509, resistors 52 and 507, capacitors 503 and 508, a comparator 504, a reference voltage source 505, exclusive OR gates (EOR) 506 and 510, and a switch 511.

Referring to the operation waveform diagram of FIGS. 6A and 6B, the operation of the circuit of FIG. 5 will be described.

Figure 6:
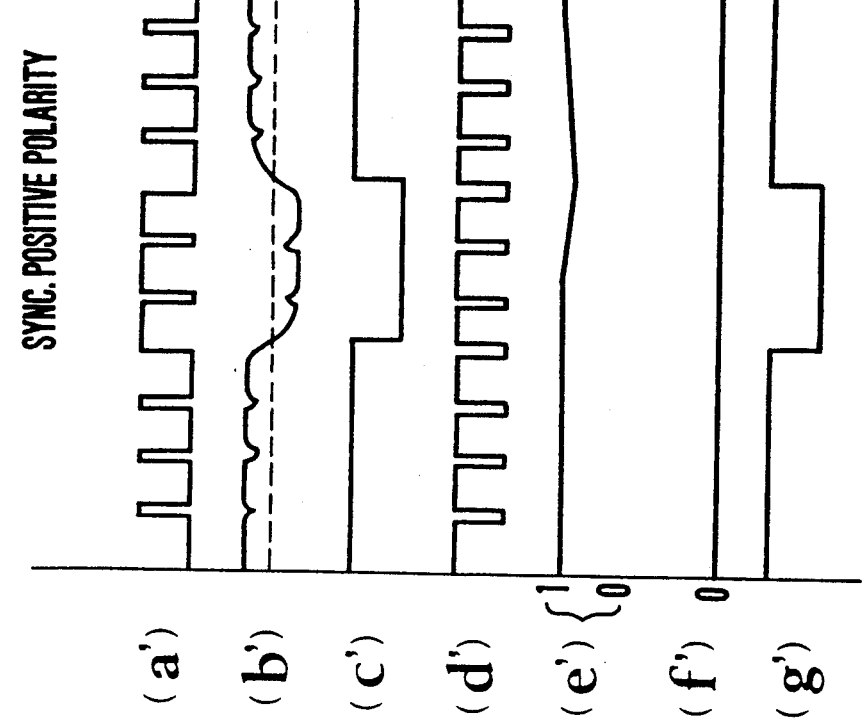
FIGS. 6A and 6B are diagrams for explaining the operation of the circuit illustrated in FIG. 5.

The operation will be made as to the case where a negative polarity synchronizing signal (a) shown in a time chart FIG. 6A is fed to the synchronizing signal input terminal 1. The negative polarity synchronizing signal (a) is inverted in the invertor 51. Thereafter, the synchronizing signal (a) is integrated by an integrating circuit constituted by the resistor 52 and the capacitor 503 so as to obtain an integral signal (b) in the time chart FIG. 6A. The integral signal (b) is compared by the comparator 504 with a reference voltage of the reference voltage 505. A dotted line shown in a waveform (b) in the time chart shown in FIG. 6A represents the voltage level of the reference voltage source 505. Thus, an output signal (c) is generated at the output portion of the comparator 504. The output signal (c) is a vertical synchronizing signal portion of the fed synchronizing signal (a) extracted at that time. Exclusive-ORing between the output signal (c) and the fed synchronizing signal (a) is executed in the EOR 506. The EOR 506 produces a horizontal sychronizing signal (d) HD4 having a normally fixed polarity.

On the other hand, a signal (e) is a signal obtained by integrating the signal (c) through an integrating circuit constituted by the resistor 507 and the capacitor 508. As shown in the waveform (e) of FIG. 6A, the integral constant of the integrating circuit constituted by the resistor 507 and the capacitor 508 is selected so as to be larger than that of the integrating circuit constituted by the resistor 52 and the capacitor 503. Further, since the signal (e) has a substantially low level, the invertor 509 produces a signal (f) having a high level. Exclusive-ORing between the signal (f) and the signal (c) is executed in the EOR 510. The EOR 510 produces a vertical synchronizing signal (g) having a normally fixed polarity.

The foregoing is a description about the case where the negative polarity synchronizing signal (a) is fed to the circuit in FIG. 5. Similarly to the above case, in the case where a positive polarity synchronizing signal (a') is fed, a horizontal synchronizing signal (d') and a vertical synchronizing signal (g') each having a fixed polarity are obtained as shown in a time chart shown in FIG. 6B. Thus, as described above, vertical/horizontal synchronous separation and polarity unification are performed.

Figure 7:
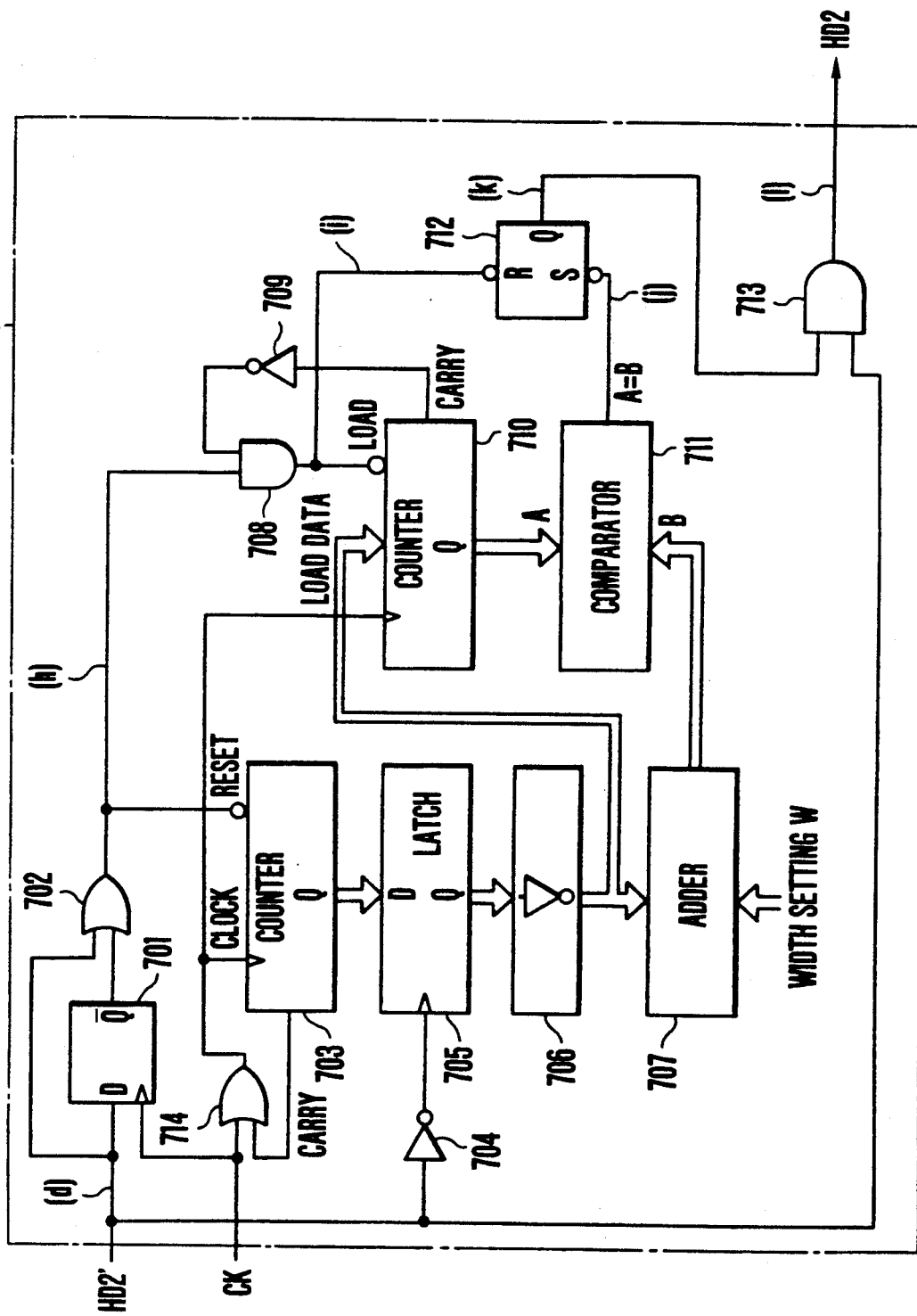
FIG. 7 is a circuit diagram showing the detailed configuration of the H (horizontal scanning period) omission countermeasure circuit illustrated in FIG. 3.

FIG. 7 shows the specific configuration of the H-omission countermeasure circuit 306 shown in FIG. 3.

In FIG. 7, the H-omission countermeasure circuit 306 includes, latches 701 and 705 each constituted by a d-type flip-flop, OR gates (OR) 702 and 714, a counter 703 having a reset terminal, invertors 704, 706, and 709, an adder 707, AND gates (AND) 708 and 713, a counter 710 having a load terminal, a comparator 711, and a set/reset type flip-flop (FF) 713.

Referring to a time chart shown in FIG. 8, the operation of the circuit shown in FIG. 7 will be described.

Figure 8:
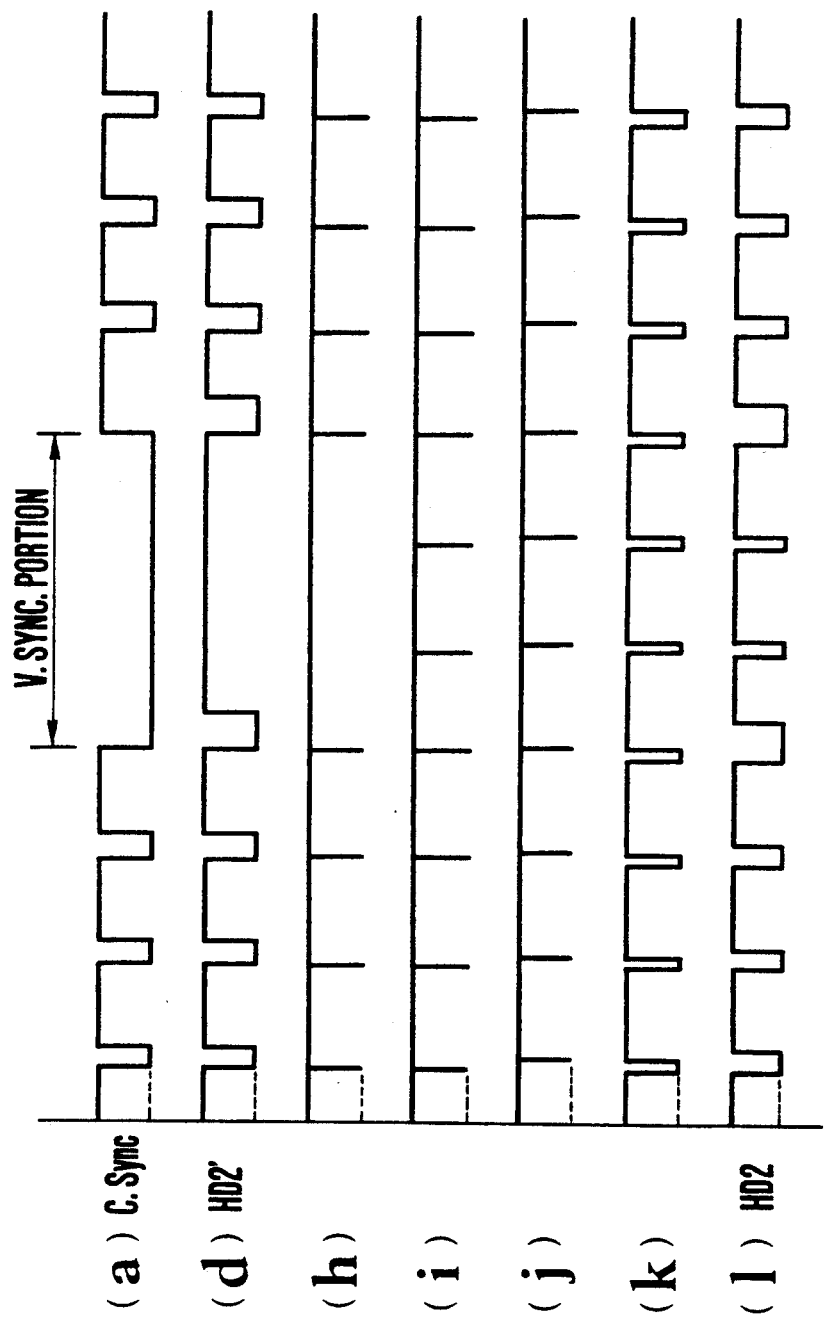
FIG. 8 is a diagram for explaining the operation of the circuit illustrated in FIG. 7.

Now, assume that a synchronizing signal (a) shown in FIG. 8 is being fed to the synchronizing signal input terminal 1 shown in FIG. 3. At this time, the synchronizing signal (a) is in the state in which the horizontal synchronizing signal HD2' is omitted at a vertical synchronizing signal portion of the synchronizing signal (a). After the respective processing in the blocks shown in FIG. 3 have been performed, the horizontal synchronizing signal HD2' is fed to the H-omission countermeasure circuit 306 shown in FIG. 7. As seen in a signal (d) in FIG. 8, the horizontal synchronizing signal HD2' also lacks a horizontal synchronizing signal at a vertical synchronizing signal portion of the horizontal synchronizing signal HD2'.

The signal (d) is differentiated by a differentiating circuit constituted by the FF 701 and the OR 702. The OR 702 produces a signal (h). At that time, a clock CK fed to the FF 701 and so on is fed from the control processing circuit 206 in FIG. 2.

Next, the signal (h) is fed to a reset terminal of the counter 703. The counter 703 counts the horizontal synchronizing signal (a). A horizontal scanning period of the horizontal synchronizing signal (a) is recognized on the basis of the count. The count data of the counter 703 are held by the latch 705. The count data held in the latch 705 is fed, through the invertor 706, to the adder 707 as well as the counter 710. The count data fed to the counter 710 are the load data of the counter.

The counter 710 is loaded with the load data in accordance with the signal (h) or a carry output of the counter 710 per se. At this time, the counter 710 performs the loading operation in accordance with the signal (h) in a portion where the horizontal synchronizing signal HD2' shown as the signal (d) exists. However, in a portion where the horizontal synchronizing signal HD2' is omitted, the load data representing the horizontal scanning period are loaded, and the loading is repeated in accordance with the carry output signal of the counter 710 per se.

Accordingly, as shown in the diagram (i) of FIG. 8, a signal which generates a pulse every horizontal scanning period is generated at a load terminal of the counter 710.

The count data of the counter 710 is compared by the comparator 711 with a sum obtained by adding a width setting value W to the load data in the adder 707. When the count data and the sum are coincident with each other, a signal (j) is produced. The signals (i) and (j) are fed to a set terminal and a reset terminal of the FF 712 respectively. The FF 712 produces a signal (k). ANDing between the signal (k) and the signal (d) is performed in the AND 713. As a result, a signal (1) in which the horizontal synchronizing signal HD2' lacking portion is supplemented with the horizontal synchronizing signal HD2' is generated. Accordingly, the control processing circuit 206 shown in FIG. 2 never makes any error in detecting a horizontal scanning frequency.

Although it has been described that the width setting value W for setting the width of the pulse supplementing the lack portion is a fixed value, the configuration may be made so that the control processing circuit 206 shown in FIG. 2 operates to calculate the width setting value W every time the synchronizing signal is fed so as to use the thus every-time calculated variable width setting value W.

Figure 9:
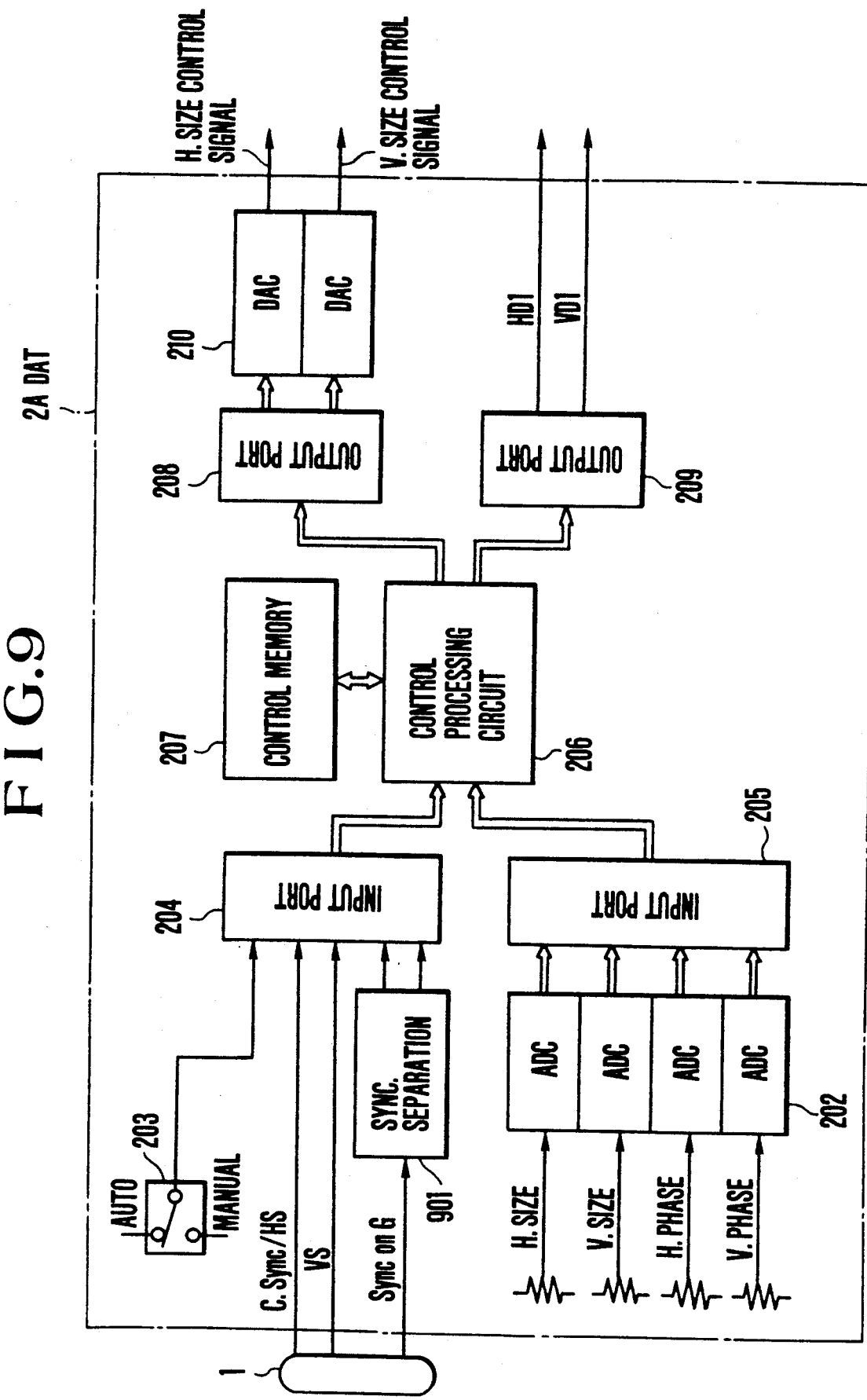
FIG. 9 is a block diagram showing the configuration of a second embodiment of the DAT circuit illustrated in FIG. 1.

FIG. 9 is a block diagram showing a second embodiment of the DAT (digital automatic tracking circuit) 2 shown in FIG. 1. In FIG. 9, the DAT 2 includes a synchronous separation circuit 901, and other items the same as or equivalent to those in FIG. 2 are referenced correspondingly.

Figure 10:
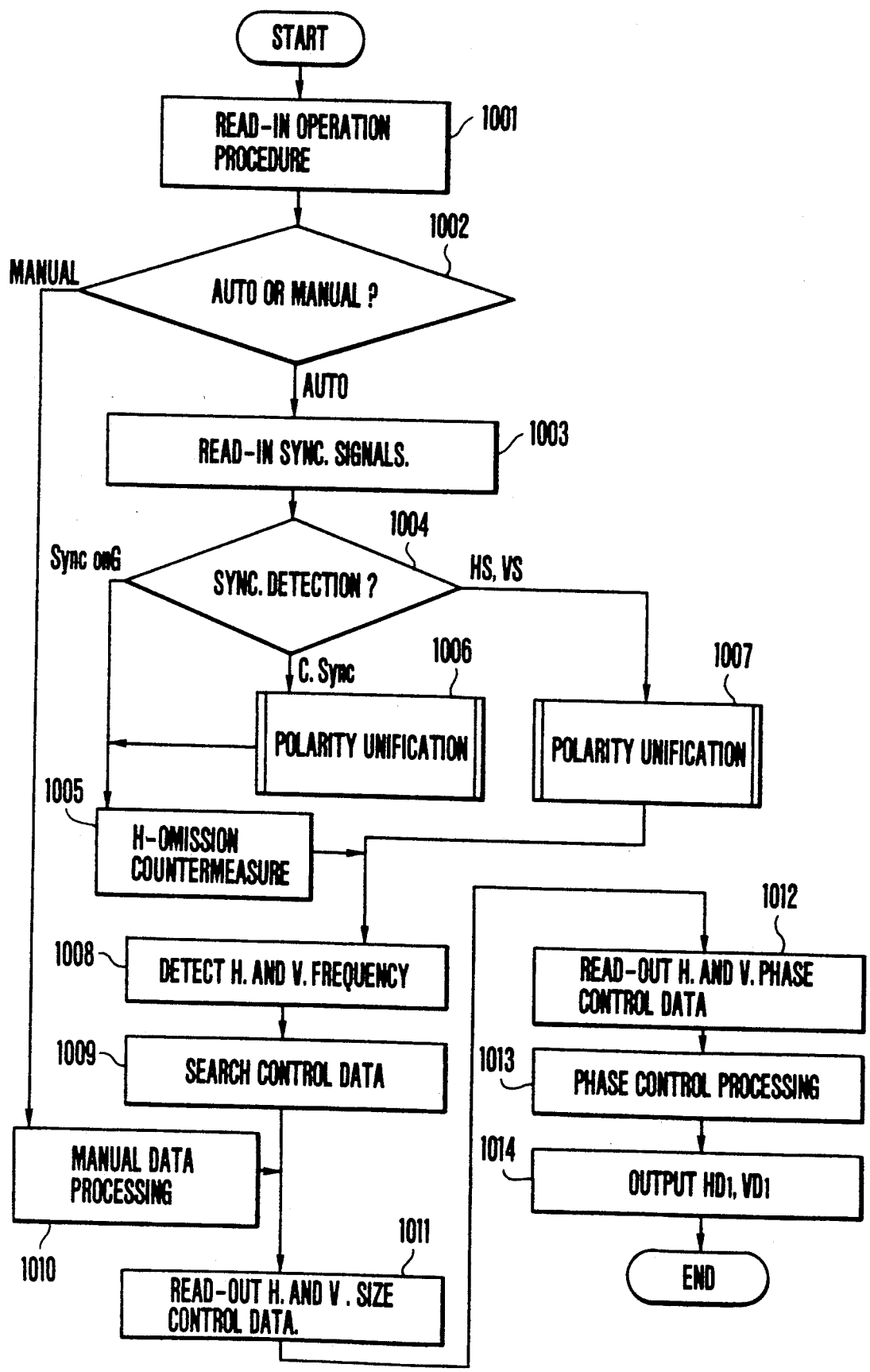
FIG. 10 is a flowchart showing the operation of the operation control circuit illustrated in FIG. 9.

In FIG. 9, the function of the synchronizing signal processing circuit 201 of the DAT 2 shown in FIG. 2 is executed by software of the control processing circuit 206. FIG. 10 is a flow chart showing the processing flow of the control processing circuit 206.

First, an operation process is read from the control memory 207 into the control processing circuit 206 (step 1001). In accordance with the operation process, the control processing circuit 206 judges whether the memory switch 203 is in an automatic mode or is in a manual mode (step 1002). When the judgment proves that the memory switch is in the automatic mode, the control processing circuit 206 receive synchronizing signals HS, VS, etc. fed to the synchronizing signal input terminal 1 through the input port 204 (step 1003). The kind of the received synchronizing signals is detected (step 1004). On the basis of the result of detection, the processing for unifying polarity is performed when the received synchronizing signal is a composite synchronizing signal "C. Sync" or separated horizontal and vertical synchronizing signals (HS, VS) (steps 1006, 1007). In the cases of a composite synchronizing signal "C. Sync" and in the case of the synchronizing signals separated from a composite video signal (Sync on G), H-omission countermeasure processing is performed (step 1005). Through the above process, synchronizing signals of the type in which a horizontal synchronizing signal HD2 and a vertical synchronizing signal VD2 are separated from each other are obtained.

Scanning frequencies of the respective synchronizing signals (HD2, VD2) are detected (step 1008). Adjusting data corresponding to the combination of the detected horizontal and vertical frequencies are searched out from the control memory 207 (step 1009).

On the other hand, in the case where the switch is in the manual mode, the control processing circuit 206 performs data processing on the data read-in through the ADC 202 and the input port 205 to thereby obtain adjusting data.

The thus obtained horizontal and vertical size adjusting data are fed, as picture-size adjusting voltages, to a deflection circuit through the output port 208 and the DAC 210 (step 1011). The horizontal and vertical phase control data for adjusting a display position are used for the operation to adjust the respective phases of the horizontal synchronizing signal HD1 and the vertical synchronizing signal VD1 (step 1012). The horizontal synchronizing signal HD1 and the vertical synchronizing signal VD1 which have been phase-adjusted are sent out from the output port 209 (steps 1013, 1014).

Figure 11:
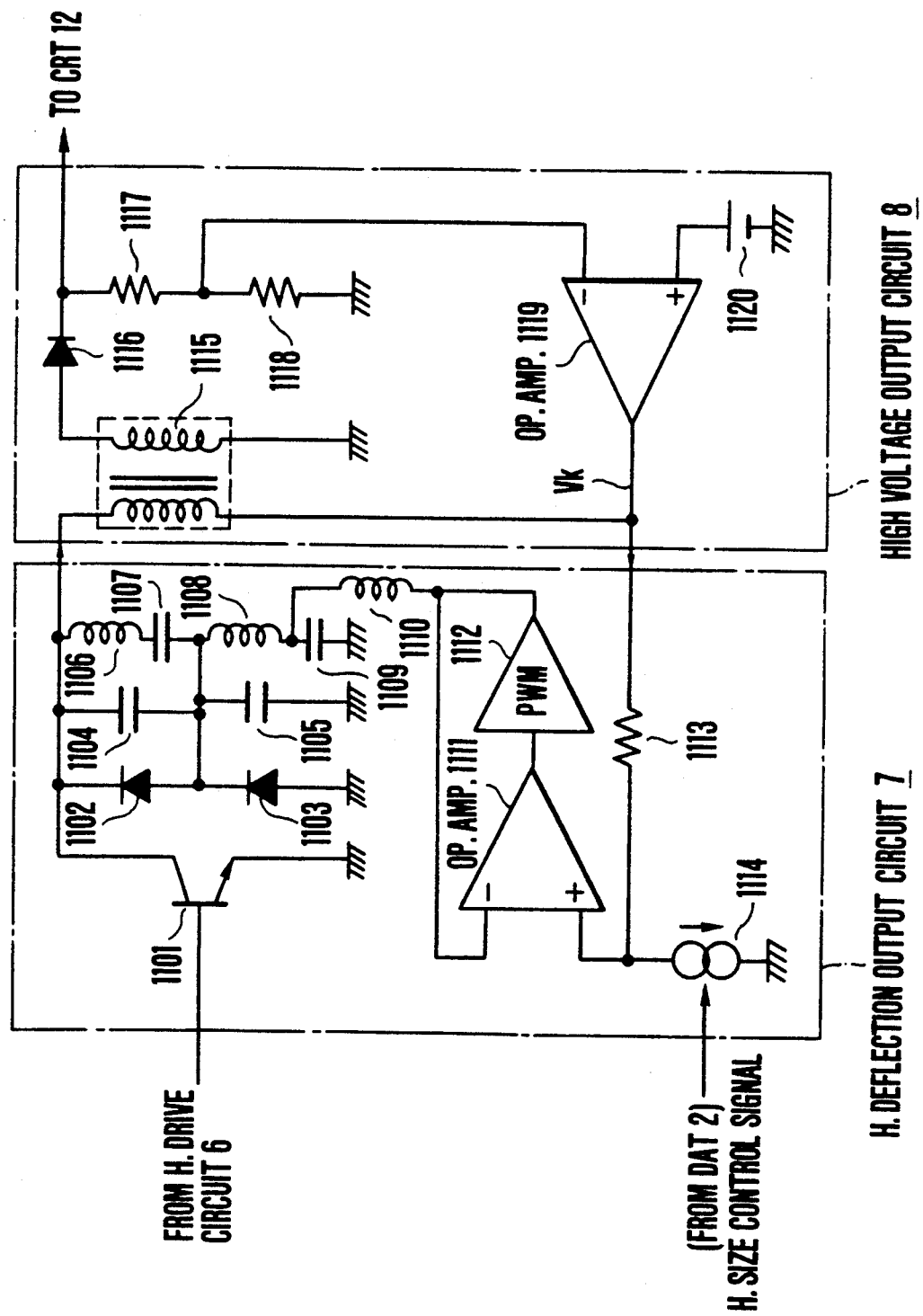
FIG. 11 is a circuit diagram showing the detailed configuration of the horizontal deflection output circuit and the high voltage output circuit illustrated in FIG. 1.

FIG. 11 is a circuit diagram showing the configurations of the horizontal deflection output circuit 7 and the high voltage output circuit 8 shown in FIG. 1.

In FIG. 11, the horizontal deflection output circuit 7 includes a horizontal output transistor 1101, a first damper diode 1102, a second damper diode 1103, a first resonance capacitor 1104, a second resonance capacitor 1105, a horizontal deflection coil 1106, a first scanning capacitor 1107, a modulating coil 1108, a second scanning capacitor 1109, a coil 1110, an operational amplifier 1111, a modulated voltage output circuit (PWM) 1112; a resistor 1113, and a variable constant-current regulated power supply 1114. The high voltage output circuit 8 includes a fly-back transformer 1115, a high voltage rectifying diode 1116, resistors 1117 and 1118, an operational amplifier 119, and a reference DC voltage source 1120.

The operation of the circuit shown in FIG. 11 will be described hereunder.

In FIG. 11, the resonance frequency of the horizontal deflection coil 1106 and the resonance capacitor 1104 is selected to be substantially equal to the resonance frequency of the modulating coil 1108 and the resonance capacitor 1105. The two resonance circuits are connected in series to each other. Hereinafter, the thus configured horizontal deflection output circuit 7 is referred to as "a diode modulation type output stage".

A horizontal driving pulse from the horizontal driving circuit 6 is fed to a base electrode of the horizontal output transistor 1101, so that horizontal scanning is started. The adjustment of the horizontal size is achieved by changing the value of a current flowing in the horizontal deflection coil 1106. A horizontal size adjusting voltage (the H-size control signal) from the DAT 2 (or 2A) is fed to the variable constant-current regulated power supply 1114, so that the value of the current of the variable constant-current regulated power 1114 changes. A voltage $V_K$ at a connection point of the resistor 1113 and the flyback transformer 1115 at its primary side is controlled so as to be constant by a high voltage stabilizing circuit constituted by the resistor 1118, the operational amplifier 1119, and the reference DC voltage source 1120. Accordingly, if the value of the current of the variable constant-current regulated power supply 114 is changed, also the input voltage on a primary side of the operational amplifier 111 changes. As a result, the output voltage of the modulated voltage output circuit 112 changes. Thus, the value of a current flowing in the horizontal deflection coil 1106 is made variable.

Even if the output voltage of the modulated voltage output circuit 112 changes, the maximum collector voltage of the horizontal output transistor 1101 does not change because the voltage on the primary side of the fly-back transformer 1115 is kept to a fixed value by the function of the diode modulation type output stage. Accordingly, the horizontal output transistor 1101 operates stably.

Figure 12:
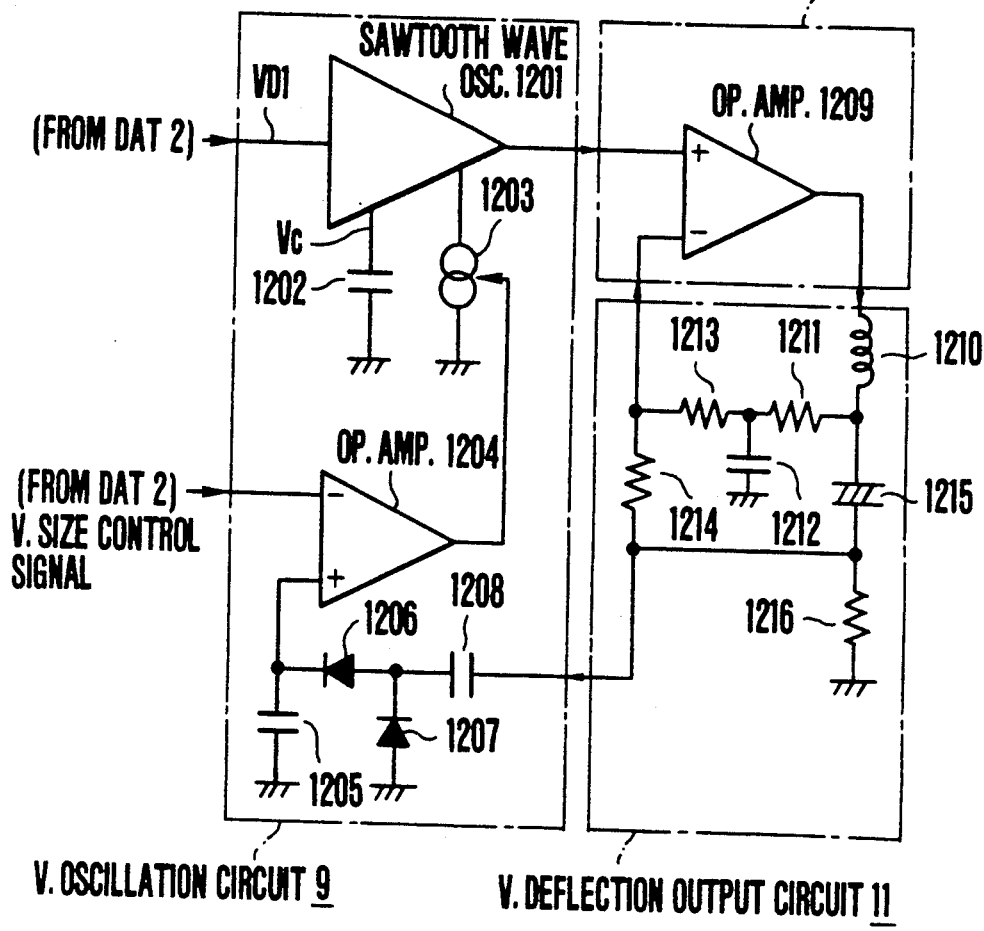
FIG. 12 is a circuit diagram showing the detailed configuration of the vertical oscillating circuit, the vertical driving circuit, and the vertical deflection output circuit illustrated in FIG. 1.

FIG. 12 is a view showing the respective configurations of the vertical oscillating circuit 9, the vertical driving circuit 10, and the vertical deflection output circuit 11 which are shown in FIG. 1.

In FIG. 12, the vertical oscillating circuit 9 includes a saw-tooth wave oscillating circuit 1201, an oscillating capacitor 1202, a variable current source 1203, an operational amplifier 1204, capacitors 1205 and 1208, and diodes 1206 and 1207. The vertical driving circuit 10 includes an operational amplifier 1209. The vertical deflection output circuit 11 includes a vertical deflection coil 1210, resistors 1211, 1213, 1214, and 1216, and capacitors 1212 and 1215.

In FIG. 12, the vertical driving circuit 10 and the vertical deflection output circuit 11 are known circuits for performing vertical deflection. Here, the adjustment of the vertical size (V-size) is performed by applying a vertical size adjusting voltage (V-size control signal) from the DAT 2 to the negative (inverted) side input terminal of the operational amplifier 1204. The operation of the vertical size adjustment will be described hereunder.

A peak value of a saw-tooth waveform generated across the resistor 1216 in a vertical period is held by a peak clip circuit constituted by the capacitors 1205 and 1208 and the diodes 1206 and 1207 so that the peak value is converted into a DC voltage. This DC voltage is compared with the above-mentioned vertical size adjusting voltage (V-size control signal) in the operational amplifier 1204 and a size control output signal is produced from the operational amplifier 1204. Accordingly, if the vertical size adjusting voltage is fixed, the crest value of the waveform generated across the resistor 1216 becomes fixed. That is, the deflection current flowing in the vertical deflection coil 1210 becomes fixed.

If the vertical size adjusting voltage (V-size control signal) changes, on the contrary, the output signal of the operational amplifier 1204 changes, and, therefore, the value of the current flowing in the variable current source 1203 changes. This state will be described by use of the waveform diagram of FIG. 13.

The saw-tooth wave oscillating circuit 1201 is being oscillated by causing electric charges stored in the oscillating capacitor 1202 to flow out through the variable current source 1203. Assume that when a vertical synchronizing signal VD1 of a vertical scanning period $T_V$ is being fed from the DAT 2 to the saw-tooth wave oscillating circuit 1201, the voltage waveform $V_C$ across the oscillating capacitor 1202 is in the state as shown by a solid line in FIG. 13, in the case of a certain, first vertical size adjusting voltage (V-size control signal).

The oscillation is triggered by the leading edge of the vertical synchronizing signal VD1, so that the oscillating capacitor 1202 is charged until the voltage thereacross becomes equal to the inner potential $V_H$ of the saw-tooth wave oscillating circuit 1201. Thereafter, the oscillating capacitor 1202 is discharged through the variable current source 1203 until the next vertical synchronizing signal VD1 comes.

Figure 13:
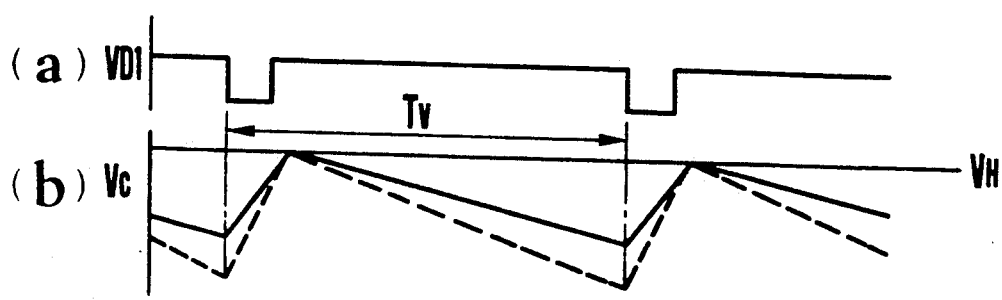
FIG. 13 is a diagram for explaining the operation of the circuit illustrated in FIG. 12.

Accordingly, when a second vertical size adjusting voltage (V-size control signal) different from the above-mentioned first vertical size adjusting voltage (V-size control signal) is fed to the operational amplifier 1204, the current value of the variable current source 1203 changes, and the waveform $V_c$ of FIG. 13 changes as indicated by the dotted line. That is, the vertical oscillation amplitude changes and hence the deflection current flowing in the vertical deflection coil 1210 changes. Accordingly, the vertical size (V-size) can be controlled by the vertical size adjusting voltage (V-size control signal) from the DAT 2.

In the above-mentioned vertical deflection circuit, stable operation property can be obtained because the vertical size control is made variable continuously unlike the prior art in which the vertical size is changed by changing over the fixed constants.

Figure 14:
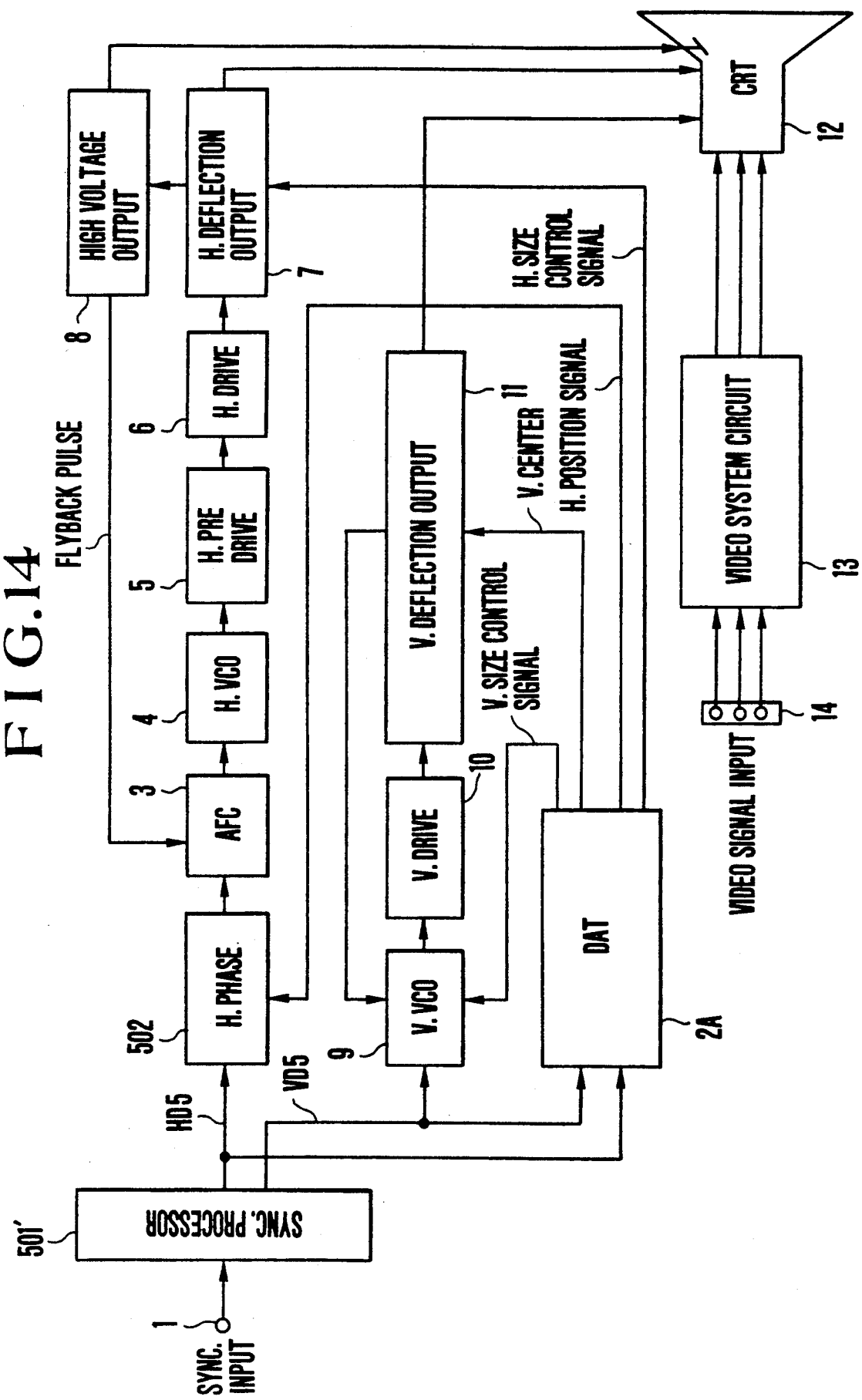
FIG. 14 is a block diagram showing a second embodiment of the display according to the present invention.

FIG. 14 is a block diagram showing the configuration of a second embodiment of the display according to the present invention.

In FIG. 14, the display includes a synchronizing signal processing circuit 501', a horizontal phase control circuit (H. PHASE) 502' and a DAT 2A which is different in configuration from the DAT 2 illustrated in FIG. 1. Other items the same as or equivalent to those in FIG. 1 are referenced correspondingly.

In FIG. 14, the arrangement of the horizontal display position, which is performed by means of software inside the DAT 2 illustrated in FIG. 1, is carried out by the horizontal phase control circuit 502' provided outside the DAT 2A. Similarly to this, the synchronizing signal processing is performed by means of hardware by the synchronizing signal processing circuit 501' which is also provided outside the DAT 2A. Further, the arrangement of the vertical display position is carried out as follows. That is, the DC current flowing in the vertical deflection coil in the vertical deflection output circuit 11 is controlled by the DAT 2A so that the start position of the vertical deflection of the cathode ray tube 12 is changed to thereby perform the vertical display position arrangement.

Also in the embodiment of FIG. 13, similarly to the embodiment as illustrated in FIG. 1, is it possible to realize picture display with an optimum display position and an optimum display size corresponding to the synchronizing signals (HS, VS, etc.) fed together with the video signal, regardless of the state (frequency) of those synchronizing signals. Further, the operation of the circuit is executed continuously and stably because the constants etc. are not changed over in the deflection circuit when the display size and the display position are changed.

Next, the configuration of the main parts of the embodiment of FIG. 14 will be described hereunder.

Figure 15:
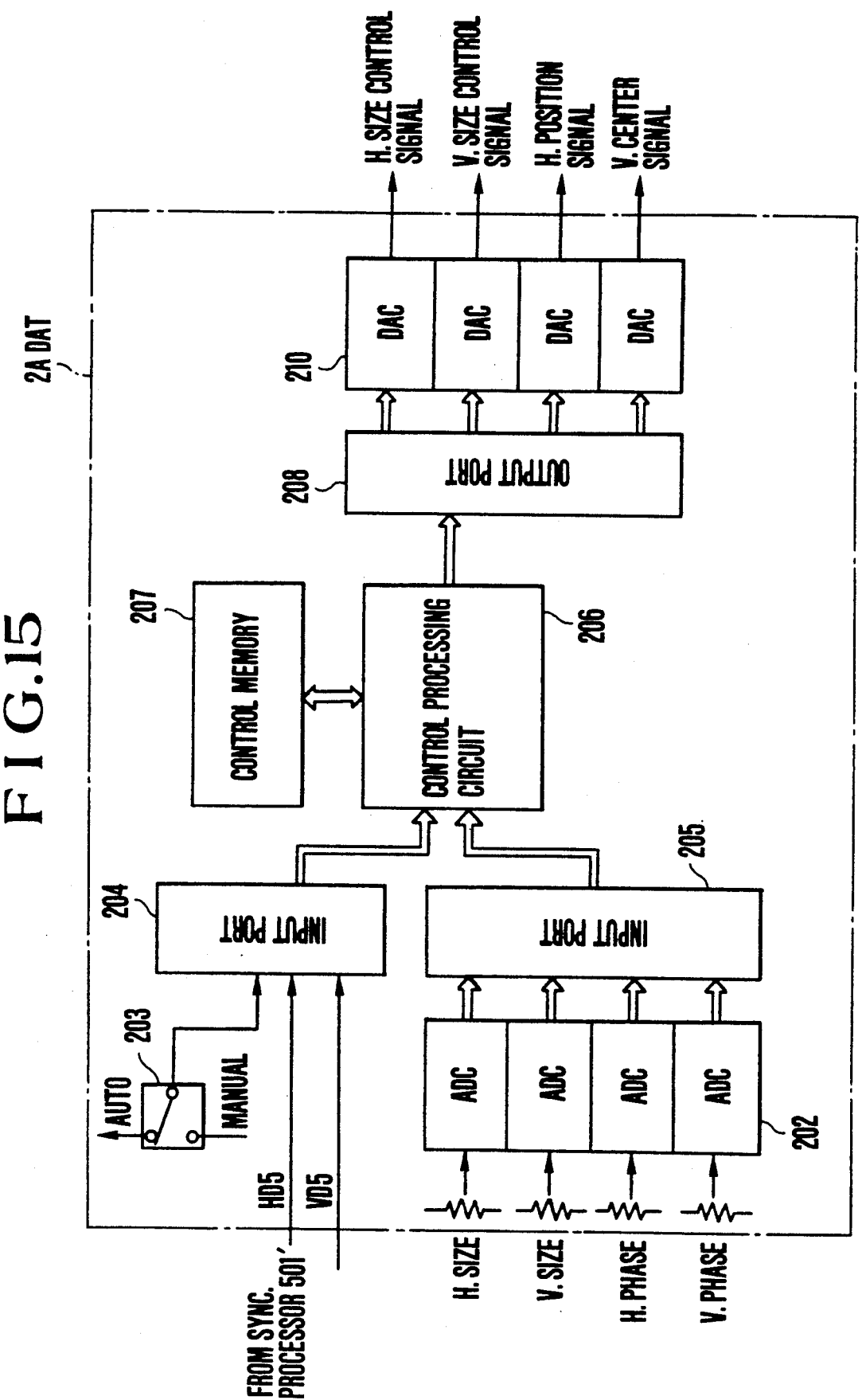
FIG. 15 is a block diagram showing the detailed configuration of the DAT circuit illustrated in FIG. 14.

FIG. 15 is a block diagram showing the detailed configuration of the DAT 2A illustrated in FIG. 14. In FIG. 15, items the same as or equivalent to those in FIG. 9 are referenced correspondingly.

In FIG. 15, a horizontal synchronous phase control voltage (H-position signal) and a vertical center control voltage (V-center signal) are produced from the DAC 210 and the display position adjustment is performed in the circuit outside the DAT 2A. Further, a horizontal synchronizing signal HD5 and a vertical synchronizing signal VD5 are fed to the input port 204 from the synchronizing signal processing circuit 501'.

Figure 16:
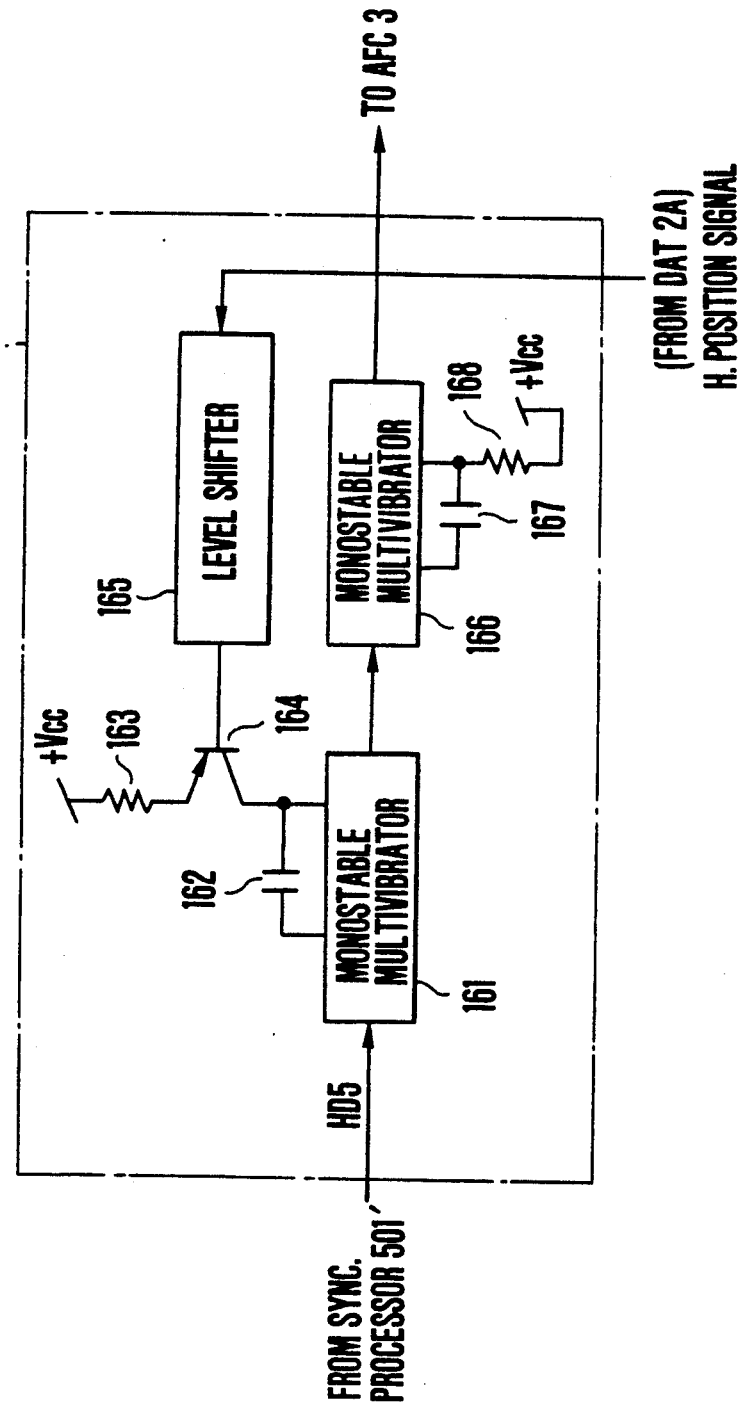
FIG. 16 is a block diagram showing the detailed configuration of the horizontal phase control circuit illustrated in FIG. 15.

FIG. 16 is a circuit diagram showing the detailed configuration of the horizontal phase control circuit (H. PHASE) 502' illustrated in FIG. 14. In FIG. 16, the horizontal phase control circuit 502' includes monostable multivibrators 161 and 166, capacitors 162 and 167, resistors 163 and 168, a transistor 164, and a level shift circuit 165.

In FIG. 16, the horizontal synchronizing signal HD5 is fed to the monostable multivibrator 161 from the synchronizing signal processing circuit 501'. The monostable multivibrator 161 changes the current value of the constant-current regulated power supply constituted by the resistor 163 and the transistor 164 to thereby change the time constant of the constant-current regulated power supply. The horizontal synchronous phase control voltage (H-position signal) from the DAT 2A is subject to level adjustment in the level shift circuit 165. The current value of the constant-current regulated power supply is adjusted by the thus level-adjusted control signal.

In such a manner as described above, the horizontal synchronizing signal HD5 is delayed and the pulse width of the horizontal synchronizing signal HD5 is expanded by the monostable multivibrator 166. The pulse width is determined by the capacitor 167 and the resistor 168. This pulse width is also variable. By executing the operation similar to the monostable multivibrator 161, the control voltage is produced from the DAT 2A and the pulse width is changed in accordance with this control voltage.

Figure 17:
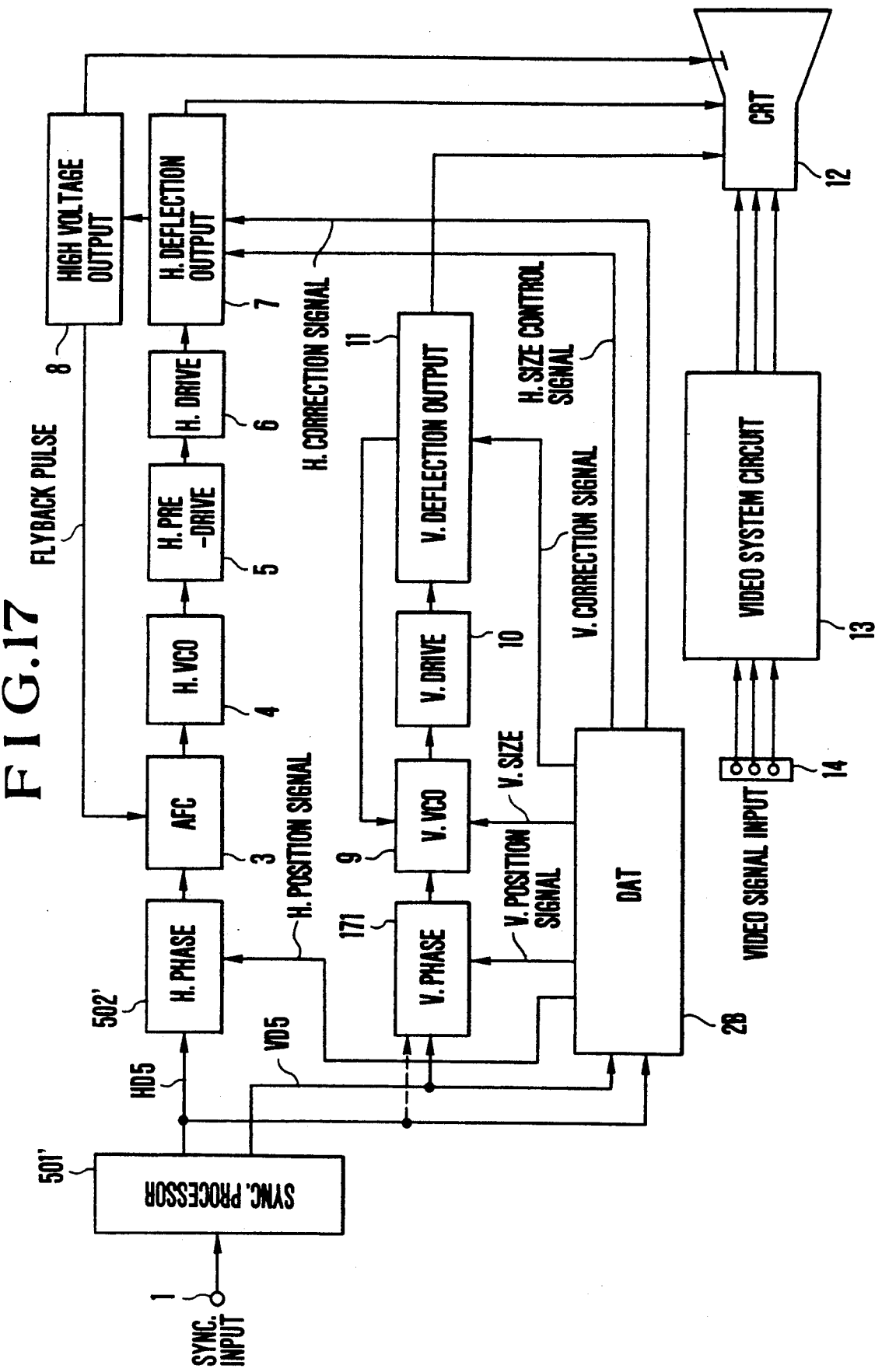
FIG. 17 is a block diagram showing a third embodiment of the display according to the present invention.

FIG. 17 is a block diagram showing the configuration of a third embodiment of the display according to the present invention. In this third embodiment, the vertical display position control performed in the second embodiment in FIG. 14 is performed in this embodiment by a vertical synchronous phase control circuit (V. PHASE) 171 and distortion correction data (V. correction signal, H. correction signal) for linearity correction or the like are generated from a DAT 2B.

These distortion correction data are stored in advance in a memory within the DAT 2B. Optical distortion correction data are read out from the memory in accordance with the synchronizing signals (HS, VS, etc.) fed to the DAT 2B. The read-out distortion correction data are fed to the horizontal deflection output circuit 7 and the vertical deflection output circuit 11. These horizontal and vertical deflection output circuits perform distortion correction such as linearity correction or the like.

As described above, this third embodiment has a further effect the correction data for the deflection circuit are automatically generated so as to realize picture display more suitably to a fed video signal in addition to the effect which can be obtained in the first embodiment (reference is made to FIG. 1) and the second embodiment (reference is made to FIG. 14).

Figure 18:
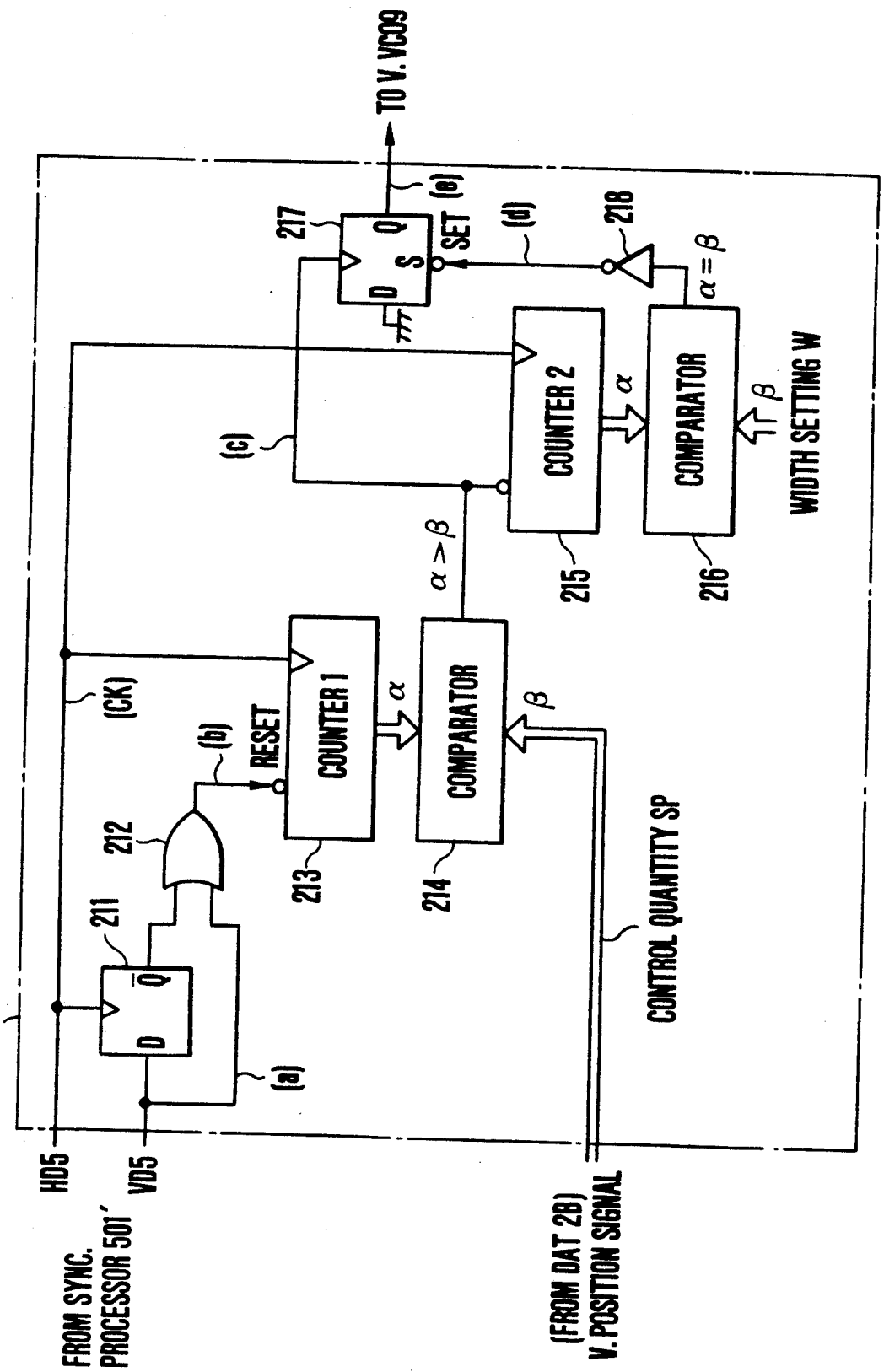
FIG. 18 is a block diagram showing the detailed configuration of the vertical phase control circuit illustrated in FIG. 17.

FIG. 18 is a block diagram showing the configuration of the vertical synchronous phase control circuit (V. PHASE) 171 illustrated in FIG. 17. In FIG. 18, the vertical synchronous phase control circuit (V. PHASE) 171 includes latches 211 and 217 each constituted by a D-type flip-flop, an OR gate (OR) 212, counters 213 and 215, comparators 214 and 216, and an invertor 218.

Figure 19:
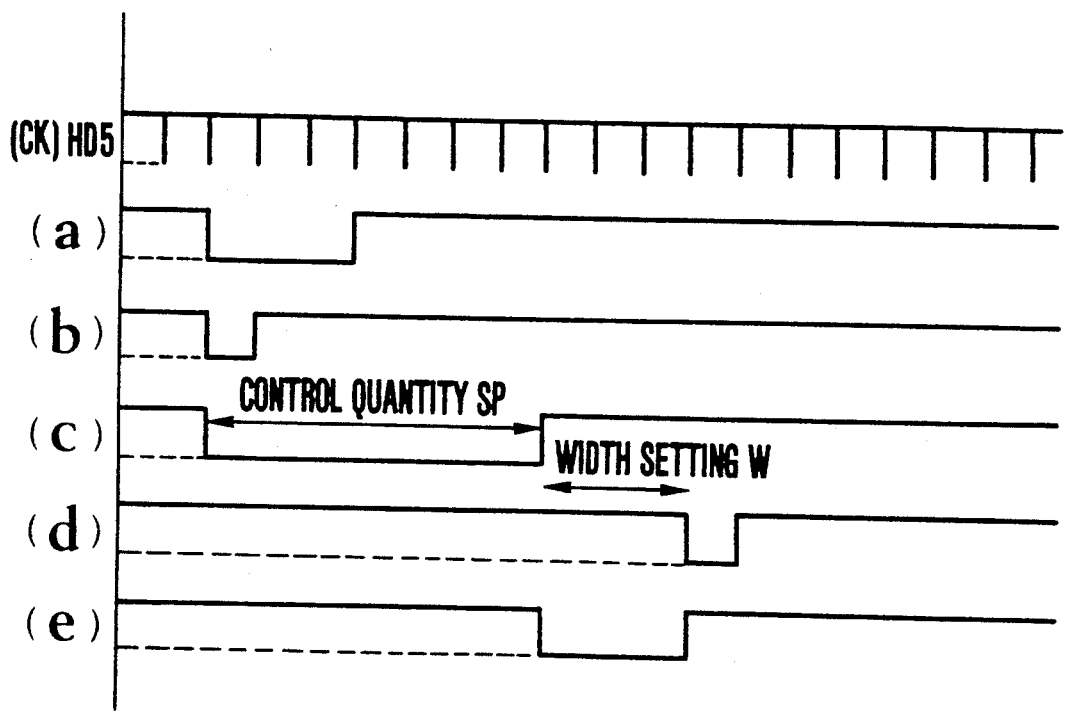
FIG. 19 is a diagram for explaining the operation of the circuit illustrated in FIG. 18.
Figure 20B:
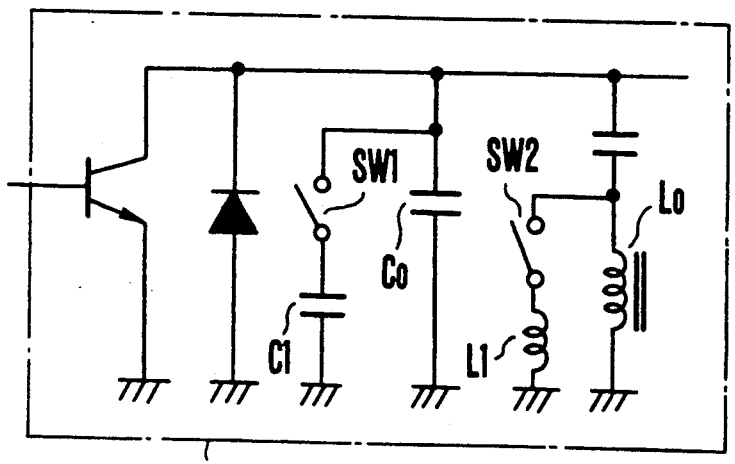
FIG. 20B is a circuit diagram showing the configuration of a conventional horizontal output circuit.
Figure 20A:
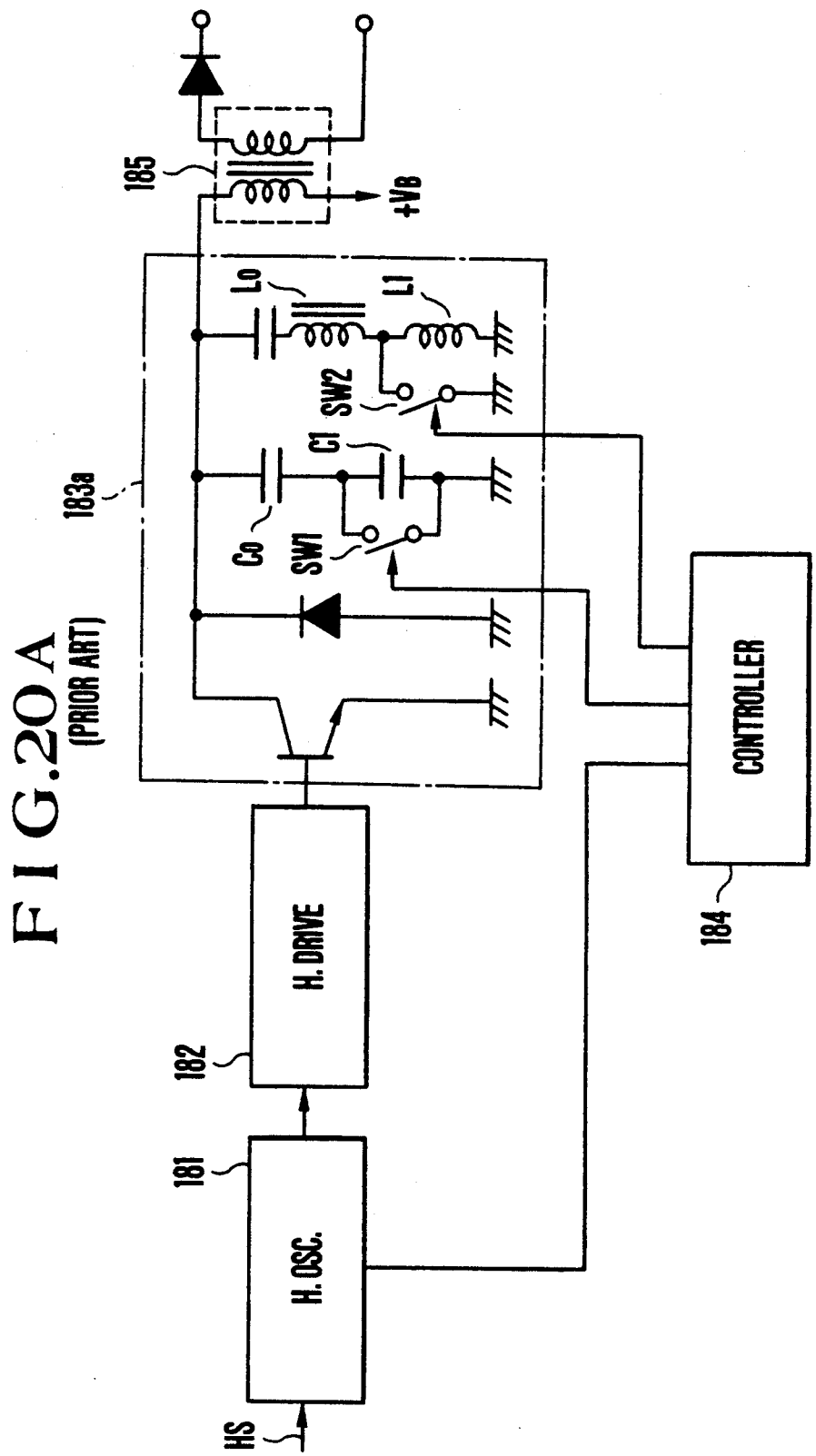
FIG. 20A is a circuit diagram showing the configuration of a conventional horizontal deflection circuit.
Figure 21:
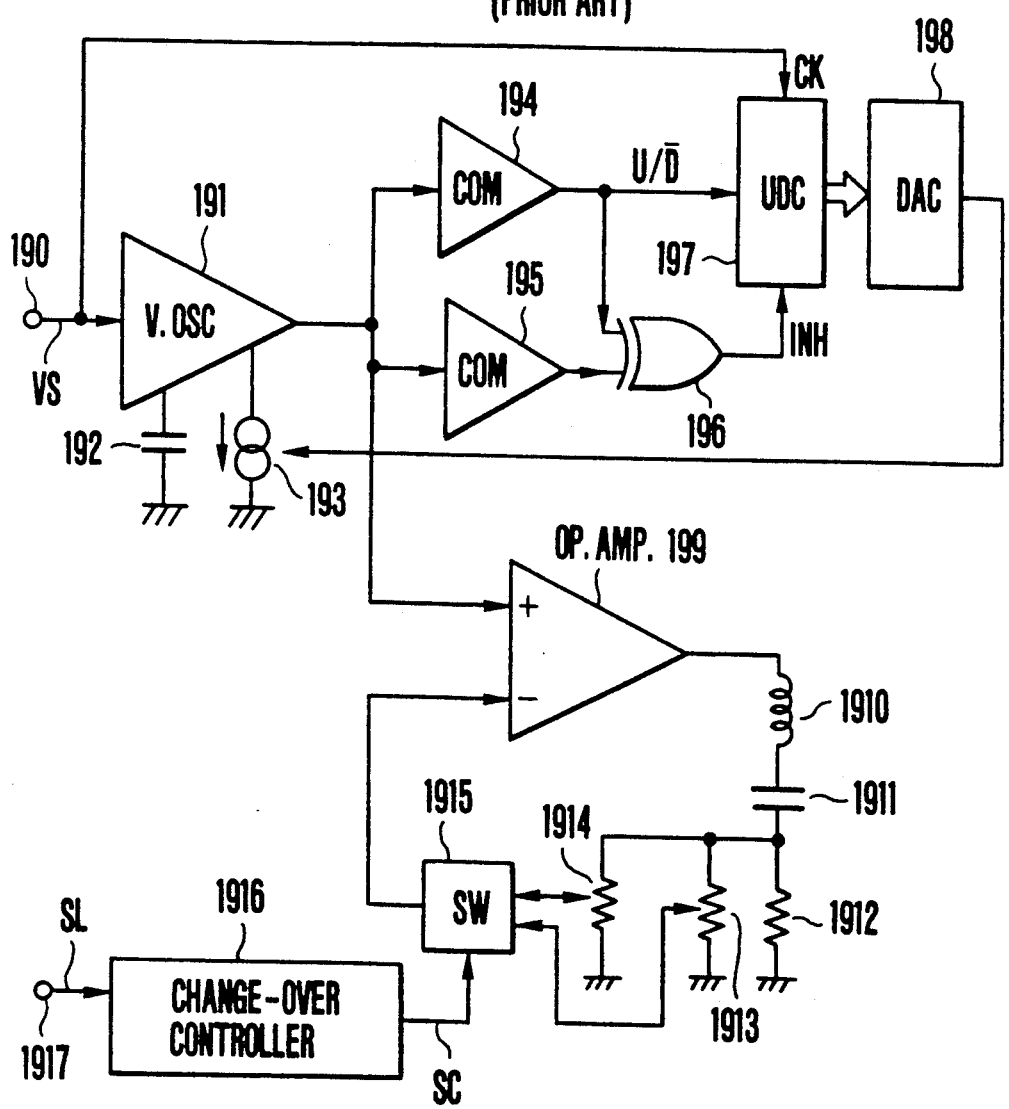
FIG. 21 is a circuit diagram showing the configuration of a conventional vertical deflection circuit.
Figure 22:
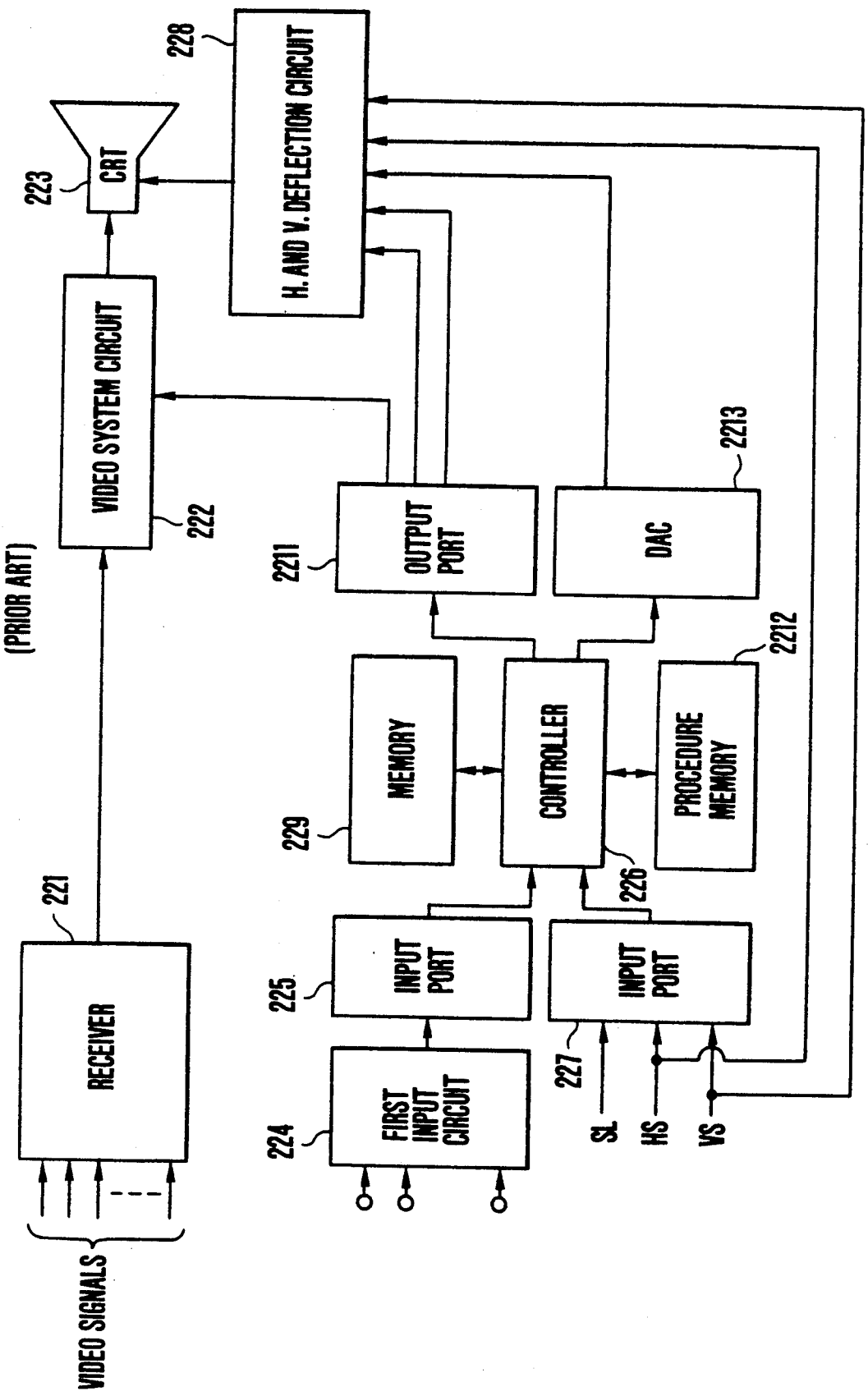
FIG. 22 is a block diagram showing the configuration of a conventional display.

By using the waveform diagram of FIG. 19, the operation of the circuit illustrated in FIG. 18.

In FIG. 18, the horizontal synchronizing signal HD5 is used as a clock CK in order to execute the phase control in a digital circuit. The path of the horizontal synchronizing signal HD5 to the input terminal of the vertical synchronous phase control circuit (V. PHASE) 171 is indicated by a dotted line in FIG. 17.

In FIG. 18, the vertical synchronizing signal (a) fed from the synchronizing signal processing circuit 501' is differentiated by a differentiating circuit constituted by the Latch 211 and the OR 212. The differentiated signal is set as a reset signal (b) for the counter 213. After reception of the reset signal, the counter 203 performs counting based on the horizontal synchronizing signal HD5 as a clock (CK). The count data of the counter 213 is fed to the comparator 214 as an input signal ($\alpha$) thereto. As another input signal ($\beta$) to comparator 214, a phase control quantity $S_p$ is being fed as a V-position signal from the DAT 2B. If the condition $\alpha > \beta$ is satisfied, the comparator 214 makes its output level high. Accordingly, as shown in FIG. 19, the output signal (c) rises at a point of time with a delay by the phase control quantity $S_p$ from the reset signal (b).

The signal (c) is fed to the reset terminal of the counter 215 and the clock terminal of the latch 217. The counter 215 starts its counting operation from the leading edge of the signal (c). On the other hand, the latch 217 changes the level of its output signal (e) from high to low. The count data of the counter 215 is compared in the comparator 216 with a width setting value W and the output of the comparator 216 is made high when the two inputs to the comparator 216 become equal to each other. The output signal of the comparator 216 become equal to each other. The output signal of the comparator 216 is fed to the set terminal of the latch 217. As a result, the latch 217 raises the level of its output signal (e) from low to high. In the manner described above, the phase control of the vertical synchronizing signal VD5 is performed.

As described above, if peculiar synchronizing signals accompanied by a video signal is fed to the multi-scanning display according to the present invention, control for realizing a picture scene having an optimum display size and an optimum display position suitable to the status (frequencies) of the synchronizing signals is automatically performed. Further, a user may manually adjust the display size and display position properly. Furthermore, the horizontal and vertical deflection circuits can operate continuously in a stable manner even if the synchronizing signals fed thereto are changed over because the horizontal and vertical deflection circuits automatically follow the instructions for the optimum display size and display position suitable to the synchronizing signals fed thereto.

We claim:

1. A display apparatus for displaying pictures carried by at least one of several types of input video signals each containing inherent synchronization signals by automatically displaying a picture with predetermined size and position on a display screen for each type of said input video signal, said inherent synchronization signals are of at least three types with a first type synchronization signal composed of a composite synchronization signal superimposed on a primary color signal, a second type synchronization signal composed of opposite polarity horizontal and vertical synchronization signals and a third type synchronization signal composed of separate horizontal and vertical synchronization signals, said display apparatus comprising:

a horizontal deflection circuit means for controllably performing a horizontal scanning operation;

a vertical deflection circuit means for controllably performing a vertical scanning operation;

synchronization signal processing means for receiving any one of said types of input video signals and for producing horizontal and vertical synchronization signals corresponding to said inherent synchronization signals included in received input video signals, with said synchronization signal processing means including first-type horizontal/vertical separation means for producing the corresponding horizontal and vertical synchronization signals from said first type synchronization signal, second-type horizontal/vertical separation means for horizontal and vertical synchronization signal separation and polarity-unification for producing the corresponding horizontal and vertical signals from the selected one of the second and the third type synchronization signals, and synchronization detection means for detecting said second type synchronization signal to enable horizontal and vertical signal separation and polarity-unification of said second type synchronization signal and for detecting said third type synchronization signal to enable polarity unification of said third type synchronization signal;

memory means for storing predetermined picture size and position control information, which includes horizontal display size control data, vertical display size control data, horizontal synchronization signal phase control data for determination of horizontal display positions and vertical synchronization signal phase control data for determination of vertical display positions, respectively corresponding to horizontal and vertical synchronization signals produced from said types of input video signals;

control processing means responsive to a horizontal frequency and a vertical frequency of the horizontal synchronization signal and the vertical synchronization signal produced by said synchronization signal processing means, for reading the respective size control data and phase control data from said memory means and outputting corresponding control signals to control said horizontal deflection circuit and to control said vertical deflection circuit to display a picture from the received input video signal with a predetermined size and position on said display screen.

2. A display apparatus according to claim 1, in which said control processing means includes a manual control means for externally manually causing said memory to store control information concerning the picture display size and picture display position on said display screen.

3. A display apparatus for displaying pictures carried by at least one of several types of input video signals each containing inherent synchronization signals by automatically displaying a picture with predetermined size and position on a display screen for each type of said input video signal, said inherent synchronization signals are of at least three types with a first type synchronization signal composed of a composite synchronization signal superimposed on a primary color signal, a second type synchronization signal composed of opposite polarity horizontal and vertical synchronization signals and a third type synchronization signal composed of separate horizontal and vertical synchronization signals, said display apparatus comprising:

an automatic frequency control circuit means for producing a control signal corresponding to the phase of a horizontal synchronization signal;

a horizontal oscillation circuit means for generating a horizontal oscillation signal in response to and corresponding to said control signal from said automatic frequency control circuit means;

a horizontal driving circuit means for producing a horizontal drive signal in response to said horizontal oscillation signal;

a horizontal deflection output circuit means for controllably producing a horizontal deflection signal in response to said horizontal drive signal;

a vertical oscillation circuit means for controllably generating a vertical oscillation signal in response to a vertical synchronization signal;

a vertical driving circuit means for producing a vertical drive signal in response to said vertical oscillation signal;

a vertical deflection output circuit means for controllably producing a vertical deflection signal in response to said vertical drive signal;

a cathode ray display device having said display screen for displaying a picture with said horizontal deflection signal and said vertical deflection signal;

a synchronization signal processing means for receiving any one of said input video signals and producing said horizontal and vertical synchronization signals in response to and corresponding to an inherent synchronization signal contained in the received type of input video signal;

wherein said synchronization signal processing means includes: first-type horizontal/vertical separation means for producing the corresponding horizontal and vertical synchronization signals from said first-type synchronization signal; second-type horizontal/vertical separation means for horizontal/vertical separation and polarity-unification for producing the corresponding horizontal and vertical synchronization signals from each of said second and said third type synchronization signals, and synchronization detection means for detecting the second type synchronization signal to enable horizontal/vertical separation and polarity-unification of said second type synchronization signal and for detecting said third type synchronization signal to enable polarity unification of said third type synchronization signal;

memory means for storing predetermined display picture size and position control information, which includes horizontal display size control data, vertical display size control data, horizontal synchronization signal phase control data for determination of horizontal display positions and vertical synchronization signal phase control data for determination of vertical display positions, respectively corresponding to horizontal and vertical synchronization signals produced from said types of input video signals;

control processing means responsive to a horizontal frequency and a vertical frequency of the horizontal synchronization signal and the vertical synchronization signal produced by the synchronization signal processing means, for reading the respective size control data and phase control data from said memory means and outputting corresponding (1) horizontal display size control signal to control said horizontal deflection circuit means, (2) vertical display size control signal to control said vertical oscillation circuit means (3) vertical position control signal to control said vertical deflection output circuit means, and (4) horizontal display position control signal; and a horizontal synchronous phase control circuit means connected between said synchronization signal processing means and said automatic frequency control circuit means, said horizontal synchronous phase control circuit means being adapted to change the phase of said horizontal synchronization signal to be applied to said automatic frequency control circuit means in response to said horizontal display position control signal supplied from said control processing means.

4. A display apparatus according to claim 3, wherein said memory means further stores control information comprising horizontal picture scene-distortion correction data and vertical picture scene-distortion correction data; said control processing means reads said memory means to supply said horizontal picture scene-distortion correction data to said horizontal deflection output circuit means, and reads said memory means to supply said vertical picture scene-distortion correction data to said vertical deflection output circuit means;

wherein a vertical synchronous phase control circuit means is connected between said synchronization signal processing means and said vertical oscillation circuit means, said vertical synchronous phase control circuit means being adapted to change the phase of said vertical synchronization signal applied to said vertical oscillation circuit means from said synchronization signal processing means in response to the vertical position control signal supplied from said control processing means.

5. A display apparatus according to claim 3, wherein said horizontal synchronous phase control circuit means is adapted to delay the phase of said horizontal synchronization signal to be applied to said automatic frequency control circuit means according to said horizontal display position control circuit means according to said horizontal display position control signal supplied from said control processing means, and further comprising a vertical synchronous phase control circuit means connected between said synchronization signal processing means and said vertical oscillation circuit means, said vertical synchronous phase control circuit means being adapted to delay the phase of the vertical synchronization signal to be applied to said vertical oscillation circuit means from said synchronization signal processing means according to said vertical position control signal supplied from said control processing means.

6. A display apparatus for displaying pictures carried by at least one of several types of input video signals each containing inherent synchronization signals by automatically displaying a picture with predetermined size and position on a display screen for each type of said video signal, said inherent synchronization signals are of at least three types, a first type synchronization signal composed of a composite synchronization signal superimposed on a primary color signal, a second type synchronization signal composed of opposite polarity horizontal and vertical synchronization signals and a third type synchronization signal composed of separate horizontal and vertical synchronization signals, said display apparatus comprising:

an automatic frequency control circuit means for producing a control signal corresponding to the phase of a horizontal synchronization signal;

a horizontal oscillation circuit means for generating a horizontal oscillation signal in response to and corresponding to said control signal from said automatic frequency control circuit means;

a horizontal driving circuit means for producing a horizontal drive signal in response to said horizontal oscillation signal;

a horizontal deflection output circuit means for controllably producing a horizontal deflection signal in response to said horizontal drive signal;

a vertical oscillation circuit means for controllably generating a vertical oscillation signal in response to a vertical synchronization signal;

a vertical driving circuit means for producing a vertical drive signal in response to said vertical oscillation signal;

a vertical deflection output circuit means for controllably producing a vertical deflection signal in response to said vertical drive signal;

a cathode ray display device having said display screen for displaying a picture with said horizontal deflection signal and said vertical deflection signal;

memory means for storing predetermined display picture size and position control information, which includes horizontal display size control data, vertical display size control data, horizontal synchronization signal phase control data for determination of horizontal display positions and vertical synchronization signal phase control data for determination of vertical display positions, respectively corresponding to horizontal and vertical synchronization signals produced from said types of input video signals; and control processing means for receiving any one of said type of input video signals to produce said horizontal and vertical synchronization signals in response to and corresponding to a synchronization signal inherent to the received type of input video signal in order to read said respective size control data and phase control data from said memory means, and outputting corresponding (1) horizontal display size control signal to control said horizontal deflection circuit means, (2) vertical display size control signal to control said vertical oscillation circuit means, (3) a delay in the phase of said horizontal synchronization signal to control said automatic frequency control circuit means according to the horizontal position control data in said memory means, and (4) a delay in phase of said vertical synchronization signal to control said vertical oscillation circuit means according to vertical position control data in said memory means.

* * * * *